United States Patent
Chang et al.

(10) Patent No.: US 11,770,181 B2
(45) Date of Patent: *Sep. 26, 2023

(54) MULTIBEAM VSAT FOR CLUSTER OF SLIGHTLY INCLINED GSO SATELLITES

(71) Applicant: SPATIAL DIGITAL SYSTEMS, INC., Camarillo, CA (US)

(72) Inventors: Donald C. D. Chang, Thousand Oaks, CA (US); Steve K. Chen, Pacific Palisades, CA (US)

(73) Assignee: SPATIAL DIGITAL SYSTEMS, INC., Camarillo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/855,790

(22) Filed: Jun. 30, 2022

(65) Prior Publication Data

US 2022/0337312 A1    Oct. 20, 2022

Related U.S. Application Data

(63) Continuation of application No. 17/243,558, filed on Apr. 28, 2021, now Pat. No. 11,381,302.

(60) Provisional application No. 63/016,912, filed on Apr. 28, 2020.

(51) Int. Cl.
*H04B 7/185* (2006.01)
*H04B 7/19* (2006.01)

(52) U.S. Cl.
CPC ....... *H04B 7/18521* (2013.01); *H04B 7/1851* (2013.01); *H04B 7/19* (2013.01)

(58) Field of Classification Search
None
See application file for complete search history.

(56) References Cited

U.S. PATENT DOCUMENTS

| 11,381,302 B1* | 7/2022 | Chang | H04B 7/1851 |
| 2011/0032143 A1* | 2/2011 | Sun | H01Q 19/132 342/354 |
| 2017/0366982 A1* | 12/2017 | Chang | H01Q 1/2266 |
| 2019/0288378 A1* | 9/2019 | DiFonzo | H04B 7/18504 |

\* cited by examiner

*Primary Examiner* — Shripal K Khajuria
(74) *Attorney, Agent, or Firm* — Phuong-Quan Hoang

(57) ABSTRACT

A source terminal, for communications with a destination terminal via satellite links to two clusters of satellites, comprises a transmitter and a multibeam antenna system. The transmitter includes a preprocessor and a bank of modulators. The preprocessor performs a K-muxing transform, which has an inverse transform, on M concurrent input data streams to generate concurrently M output data streams, $M>1$. Each output data stream is a linear combination of the M concurrent input data streams. The bank of modulators transforms N of the M output data streams into N signal streams, $N \leq M$. The multibeam antenna system transforms the N signal streams into N shaped beams and radiating $N_1$ of the N shaped beams towards the first cluster of satellites and $N_2$ of the N shaped beams towards the second cluster of satellites, where $N_1$ and $N_2$ are positive integers and $N_1 + N_2 = N$.

20 Claims, 13 Drawing Sheets

MULTIBEAM VSAT FOR CLUSTER OF SLIGHTLY INCLINED GSO SATELLITES

RELATED APPLICATIONS

This application is a continuation of application Ser. No. 17/243,558 filed on Apr. 28, 2021, which is related to communications and data transport techniques in the following references:
1. U.S. Pat. No. 10,484,081, "Ground terminals via remote digital-beam-forming networks for satellites in non-geostationary orbit";
2. U.S. Pat. No. 10,361,775, "Retro-directive antenna systems for multi-channel communications";
3. U.S. Pat. No. 10,333,900, "Enveloping for multilink communications";
4. U.S. Pat. No. 9,917,719, "Apparatus and method for remote beam forming for DBS satellites";
5. U.S. Pat. No. 9,917,635, "Distributed SATCOM aperture on fishing boat";
6. U.S. Pat. No. 9,749,033, "Smart ground-terminal antenna for geostationary satellites in slightly inclined orbits";
7. U.S. Pat. No. 7,834,807, "Retro-directive ground-terminal antenna for communication with geostationary satellites in slightly inclined orbits";
8. U.S. Pat. No. 8,111,646, "Communication system for dynamically combining power from a plurality of propagation channels in order to improve power levels of transmitted signals without affecting receiver and propagation segments";

All of the above are incorporated herein by reference in their entireties.

BACKGROUND

Field of the Disclosure

Orbital slots in the Geostationary Satellite Orbit (GSO) have been key assets for satellite communications since 1960s because of available low-cost and effective ground terminals that have been able to support communications satellites in these orbital slots without dynamic tracking mechanisms. GSO satellites are stationary as far as these ground terminals are concerned. Each orbital slot supports a communication satellite covering its service areas over selected frequency bands, such as C, Ku, Ka, and other bands. To utilize their associated bandwidth assets fully, these GSO orbital slots are usually occupied by high-power, large, sophisticated, state-of-art communications satellites servicing multiple coverage areas. The total bandwidth over the selected frequency bands delivered by satellites in a GSO orbital slot to a coverage area is limited even with polarization re-usage.

This application is about methods and apparatuses to enhance the bandwidth effectiveness in utilizing these orbital slots with a cluster of satellites in slightly inclined GSO orbits. As far as users in a coverage area near the earth surface or on ground are concerned, a satellite in the cluster will move slowly in a slim "figure 8" locus daily; in the north-south (N-S) direction mostly and slightly in the east-west direction "centered" on a GSO orbital slot. On the other hand, as far as the satellite in the cluster is concerned, a geographic area for service coverage near its boresight is "moving in the N-S direction and breathing" slowly in a daily cycle.

The cluster of these satellites will be organized and utilized to transport data streams at faster rates via multiple folds of total bandwidth re-usage by the GSO orbital slot. Active number of satellites in the cluster for a communication service will be designed with redundancy in supporting graceful retirement and replenishment features.

VSAT stands for Very Small Aperture Terminal. Technically, VSAT refers to any two-way satellite ground-mounted or a stabilized maritime VSAT antenna with an antenna (dish) that is smaller than 3 meters; people generally use the term VSAT to refer to any two-way satellite Internet terminal that is not a teleport Earth Station.

VSAT antennas can be vehicle-mounted, maritime-stabilized, fixed, or portable. Currently, VSATs mostly feature a single beam antenna pointing to a designated GSO satellite in forming satellite networks. Each network has its own requirements as to dish size and transmit power. Scientific calculations based on geographic location, desired IP data rate, and circuit reliability and survivability from environmental conditions are called Link Budgets. The minimum size of a VSAT antenna that will meet a particular customer's needs is determined by each satellite network operator's Link Budget calculations.

There are needs for better privacy protection on data transport in satellite communications. Multi-beam VSAT techniques are used to assure reliable concurrent satellite connections between a data source and a data destination. Incoherent wavefront multiplexing (WF muxing or K-muxing) via multiple transponders will enhance privacy protection on data communications via multiple satellite transponders. The disclosure relates to methods and architectures of packing or enveloping data using WF muxing or K-muxing for transport via parallel communication links. The K-muxing transforms are implemented in a preprocessor of a satellite ground terminal as the data source.

These multiple links are through various transponders on different satellites in a dynamic cluster hovering or roaming in N-S directions centered on a GSO orbital slot. Angular separations of these satellites are dynamic, and in most of the time, large enough to allow frequency re-use to a common service area. As a result, many of the transponders can and will be operated in common frequency channels.

It also relates to methods and architectures of unpacking or de-enveloping using wavefront de-multiplexing (WF demuxing or K-demuxing) to reconstitute transported data stream from multiple parallel communication links. The K-demuxing transforms are implemented in a post-processor of a satellite ground terminal as the data destination.

The "enveloping" is focused to appearance of data package/envelope and reliability of enclosed data. The K-muxing implemented on information digital stream before modulation in radiation chains in a transmitter shall provide enhanced data privacy and better availability in multiple-link communications between an information source and an information destination. The wavefront multiplexed (WF muxed or K-muxed) information data streams in a source will be individually and concurrently sent via the multiple links accordingly for information data transport to a destination. The related K-demuxing will be performed on information digital streams after demodulation in receiving chains in a corresponding receiver.

We use the terms "information data streams" and "digital information streams" to differentiate from the terms "data signals" and "digital signal streams". In a transmission chain, modulators convert information data streams into data signals before transmission. Similarly, in a receiving chain, demodulators convert received digital signal streams into digital information streams. The incoherent K-muxing and K-demuxing transforms are used for processing information data streams and digital information streams, for the benefits of enhanced privacy and better availability.

On the other hand, the coherent K-muxing and K-demuxing for processing data signals and digital signal streams will be used for power combining and/or dynamic resource allocations for communications channels.

This application addresses enhanced privacy, and better reliability (or availability) of data transports in communications with parallel satellite links via a cluster of satellites in slightly inclined GSO orbits. The satellites provide frequency-translating and power-amplifying (or transpondering) functions to data streams pre-processed and "organized" by ground terminals at data sources on client sides. Low-cost ground terminals capable of forming multiple tracking beams concurrently are one of the key enablers.

Many of the data may be image or audio related. Since multiple data sets to be transported will be preprocessed on client sides, each of the transported data is a multiplexed (muxed) data set individually, which is unintelligible on its own.

Embodiments of "writing" and "reading" processes will be summarized and presented concisely. "Writing" features a process on multiple original images concurrently via WF muxing or K-muxing transformation, generating WF muxed or K-muxed data before transmitting. A "reading" process corresponds to a WF demuxing or K-demuxing transformation on WF muxed or K-muxed data relayed by multiple satellites, reconstituting original data sets. The enveloping is a subset of "writing" procedures under constraints that enveloped messages, or products of the writing procedures, shall preserve some desired features in digital appearance, and the de-enveloping is a subset of reading procedures to reconstitute embedded mails from the enveloped messages.

SUMMARY

Transponders on multiple satellites in a cluster are organized by incoherent wavefront multiplexing (WF muxing or K-muxing) techniques to enhance privacy protection on data communications between a source and a destination near or on the earth surface. The satellites in the cluster are slowly moving mostly in north-south directions daily individually in various slightly inclined Geostationary Satellite Orbits (GSOs) centered on a GSO orbital slot as far as the source and the destination are concerned. Strictly speaking, the slightly inclined GSO satellites in the cluster are in various geo-synchronous orbits with a 24-hour orbital period. Their daily maximum angular drifts in the North-South directions with respect to the earth equatorial plane, or the GSO plane, are kept to less than ±8° and less than a few tenths of a degree, say ±0.2°, in the East-West direction. Payloads on the satellites shall be programmed to orient their antennas toward corresponding converged areas in a daily cycle. The payloads on these satellites may feature contoured coverage beams or high-gain spot beams in various frequency bands.

The cluster of these satellites will be organized and utilized to transport data streams at faster rates via multiple folds of total bandwidth re-usage by a chosen GSO orbital slot. Active number of communications satellites in the dynamic cluster for a network service will be designed with redundancy in supporting daily operation with higher survivability and reliability, as well as graceful retirement and replenishment features.

Ground users will efficiently utilize an enhanced bandwidth asset associated with the dynamic satellite cluster for a GSO orbital slot via a multibeam VSAT with capability to track individual satellites in the cluster concurrently and dynamically. In one embodiment, the multibeam VSAT is a smart terminal with a controller to form orthogonal beams and direct beam positions autonomously or according to the time of day. In another embodiment, the multibeam VSAT is forming a contour beam to continuously cover a locus of a moving satellite in a group of mini-satellites or CubeSats.

The disclosure relates to methods and architectures of multiple tracking beams for ground terminals at the source and the destination, and methods of selecting different transponders on various slightly inclined GSO satellites.

It also relates to methods and architectures of packing data using wavefront multiplexing/demultiplexing (abbreviated as WF muxing/demuxing or K-muxing/demuxing) for information transport via multiple satellite communication links. The K-muxing on information data streams before modulation in a transmitter shall provide enhanced data privacy and better availability. The WF multiplexed (WF muxed or K-muxed) information data streams will be individually and concurrently sent to the multiple satellite links accordingly for data transport.

As a result, a GSO orbital slot may accommodate multiple folds of a frequency bandwidth asset to enable much faster data flow to the same coverage area at a common frequency slot from these slightly inclined GSO satellites by smart multibeam tracking ground terminals with K-muxing capability.

Wavefront multiplexing/demultiplexing (WF muxing/demuxing or K-muxing/demuxing) process features an algorithm invented by Spatial Digital Systems, Inc. (SDS) for satellite communications where transmissions demand a high degree of power-combining, security, reliability, and optimization. WF muxing/demuxing, embodying an architecture that utilizes multi-dimensional transmissions, has found applications in fields beyond conventional satellite communication domain. One such application is for data transport/storage on cloud where privacy, data integrity, and redundancy are important.

Privacy is important concern on data transport, especially in wireless communications including those via transponding satellites, air platforms and unmanned aerial vehicles (UAVs). Wavefront multiplexing/demultiplexing (WF muxing/demuxing or K-muxing/demuxing) process embodies an architecture that utilizes multi-dimensional waveforms in data transport over multiple links. Multiple data sets are preprocessed by WF muxing or K-muxing before being transported. WF muxed or K-muxed data is aggregated data from multiple input data sets that have been "customized and processed" and disassembled into any scalable number of sets of processed data in outputs, with each set being transported via a propagation link or channel. The original data is reassembled via WF demuxing or K-demuxing after retrieving a lesser but scalable number of WF muxed or K-muxed data sets from the multiple links. In short, the WF muxed or K-muxed data transport solution enhances data privacy and data availability via redundancy by, respectively, creating a new dimension to existing security or data privacy methods and significantly reducing the transported data packages needed for better availability via data redundancy formats. In addition, WF muxing/demuxing methods enable a monitoring capability on the integrity of transported data.

K-muxing/demuxing for enveloping is configured to use additional known digital data streams for probing, authentications and identifications. A method for enveloping and then sending data through multiple links comprises: (1)

transforming multiple first data sets via K-muxing into multiple K-muxed or enveloped second data sets at a transmitting side, wherein one of the K-muxed or enveloped second data sets comprises a weighted sum of the first data sets at the transmitting side; (2) sending the K-muxed or enveloped second data sets via multiple links to a destination; (3) receiving the K-muxed or enveloped second data sets at the destination; and (4) reconstituting the original first data sets via a corresponding K-demuxing operation on the enveloped second data sets.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

DETAILED DESCRIPTION OF THE INVENTION

This application is about methods and apparatuses to enhance the bandwidth effectiveness in utilizing a GSO orbital slot. The methods comprise transporting data streams from a source to a destination via multiple satellite paths in parallel, such as a dynamic cluster of satellites in slightly inclined GSO orbits centered on a GSO orbital slot. The present invention also relates to distributed transport paths via parallel satellite links with built-in redundancy via an M-to-M wavefront multiplexing (K-muxing) technique, where M≥2 and is an integer.

The M inputs to the K-muxing comprise N streams of information data with additional M−N known data files, where N≥1 and is an integer. The M independent input data streams are transformed and concurrently converted into K-muxed domain with M output wavefront components. Only M' of the M outputs will be used for data transport and/or data storage on cloud via satellite links, where M−N≤M'≤M, M'≥1 and is an integer.

Furthermore, any one of the known data files may be chosen to serve as a digital transporting envelope and will be processed accordingly in an enveloping process as a part of the M-to-M K-muxing.

Multiple inputs to an M-to-M K-muxing processor are properly "emphasized" or "weighted" so that at least one of the M outputs will become a "carrier" or a digital enveloped data stream for transporting embedded message. The selected "carrier" shall appear substantially identical to the appearance of the selected digital envelope to human sensors. The identical appearance comprises unique and easily distinguishable features from other digital data files. These features may be visual pictures, videos, audio music, word files, or multimedia files.

Embodiment 1

Figure 1A:
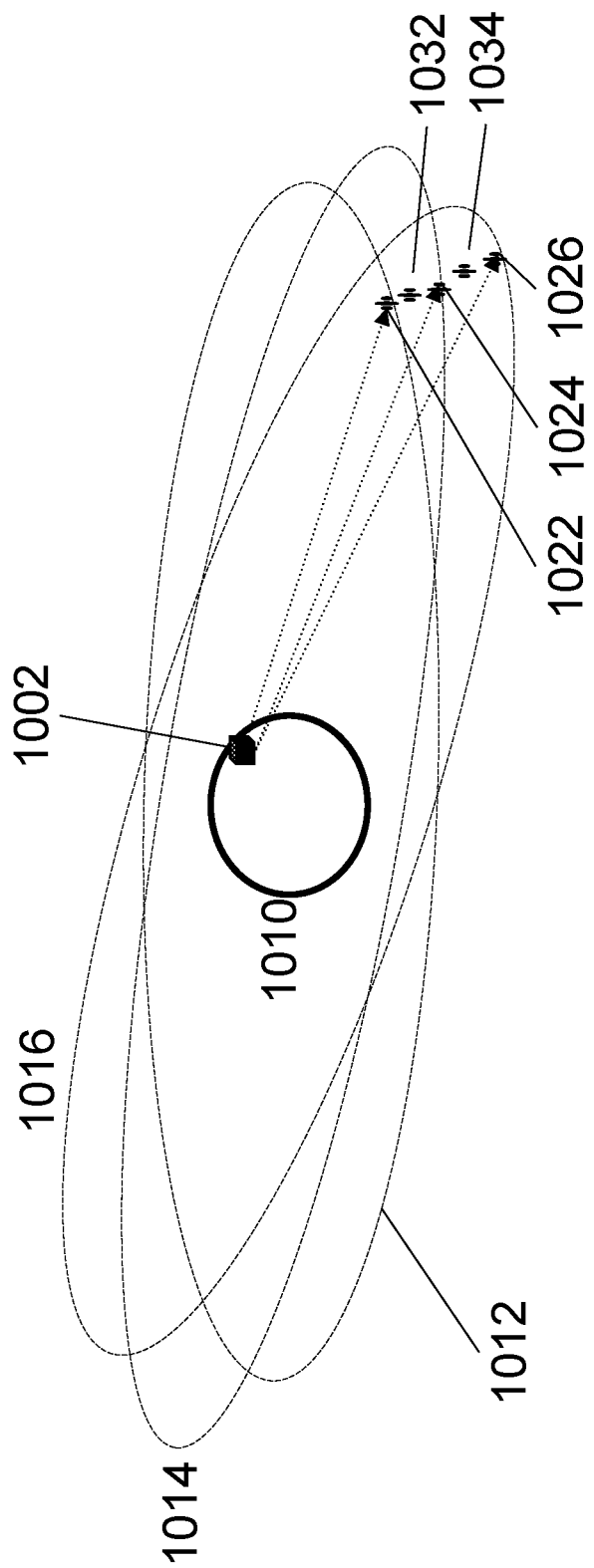
FIG. 1A depicts a data source 1002 on earth ground 1010 and 5 relaying satellites 1022, 1024, 1026, 1032, and 1034, moving in different slightly inclined Geostationary-Satellite-Orbit (GSO) orbits 1012, 1014, and 1016, and forming a dynamic cluster centered on a GSO orbital slot, in accordance with one embodiment of the invention.

FIG. 1A depicts a concept of parallel communications links from a data source 1002 as a sender on or near the surface of the earth 1010 to multiple (M=5) transponding satellites 1022, 1024, 1026, 1032, and 1034 moving synchronously in various slightly inclined GSO orbits 1012, 1014, and 1016. These orbits are geo-synchronous orbits with a 24-hour period. The first satellite 1022 is moving in the first slightly inclined GSO orbit 1012. Similarly, the second and the third satellites 1024 and 1026 are moving in the second and the third slightly inclined GSO orbits 1014 and 1016, respectively. The fourth and the fifth satellites 1032 and 1034 are moving in the corresponding $4^{th}$ and the $5^{th}$ slightly inclined GSO orbits which are not shown in the figure. The 5 satellites shall be properly deployed individually to cross over the equator at an associated GSO orbital slot in different local timelines. The local timelines are referred to the local time near a data source or that of a data destination on earth.

Under an assumption that the incline angles for the 5 inclined orbits are identical and equal to 6°, as an example, the first satellite 1022 moving in the first slightly inclined GSO orbit 1012 is deployed to assure its equator downward-crossing be at around 1:00 am local time, while the $2^{nd}$, the $3^{rd}$, the $4^{th}$, and the $5^{th}$ satellites 1024, 1026, 1032, and 1034 will be time-phased to have their corresponding equator downward-crossing time slots in local time at near 4:50 am, 10:40 am, 3:30 pm, 8:15 pm, respectively.

In one embodiment, a communications system through a dynamic cluster of multiple satellites depicted in FIG. 1A comprises multiple small satellites (smallsats) with weights about 150 Kg each, or mini-satellites such as nanosats or CubeSats with weights much less than 100 Kg each. In another embodiment, a communications system through a dynamic cluster of multiple satellites similar to the one depicted in FIG. 1A comprises multiple mini-satellites such as nanosats or CubeSats with weights much less than 100 Kg each. In one embodiment, a dynamic cluster of multiple satellites as depicted in FIG. 1A comprises multiple high throughput satellites (HTS) with capability of forming reconfigurable spot beams. In one embodiment, a dynamic cluster of multiple satellites as depicted in FIG. 1A comprises multiple fixed service satellites (FSS) with capability of forming configurable contour beams.

In one embodiment, another time-phasing procedure for these satellites may be optimized to allow maximized angular separations for specified local time periods of the day as alternate criteria. In another embodiment, a time-phasing procedure for these satellites may be optimized in maximizing available time periods in daily operations for frequency re-use among adjacent satellites with adequate angular separations as other alternate criteria.

Multiple data streams from a data source 1002 on or near the surface of earth 1010 are sent to the dynamic cluster of relaying satellites 1022, 1024, 1026, 1032, and 1034 via a multiple-beam ground terminal. In one embodiment, at least two transponders on two different satellites in the cluster of relaying satellites 1022, 1024, 1026, 1032, and 1034 operate in a common frequency slot for corresponding uplinks from the multiple-beam ground terminal to the two satellites. In one embodiment, transponders on different satellites in the cluster of relaying satellites 1022, 1024, 1026, 1032, and 1034 operate in various frequency slots for corresponding uplinks from the multiple-beam ground terminal to the satellites. For example, one transponder operates in one of the frequency slots in Ku band, while another transponder operates in one of the frequency slots in Ka band.

Figure 1B:
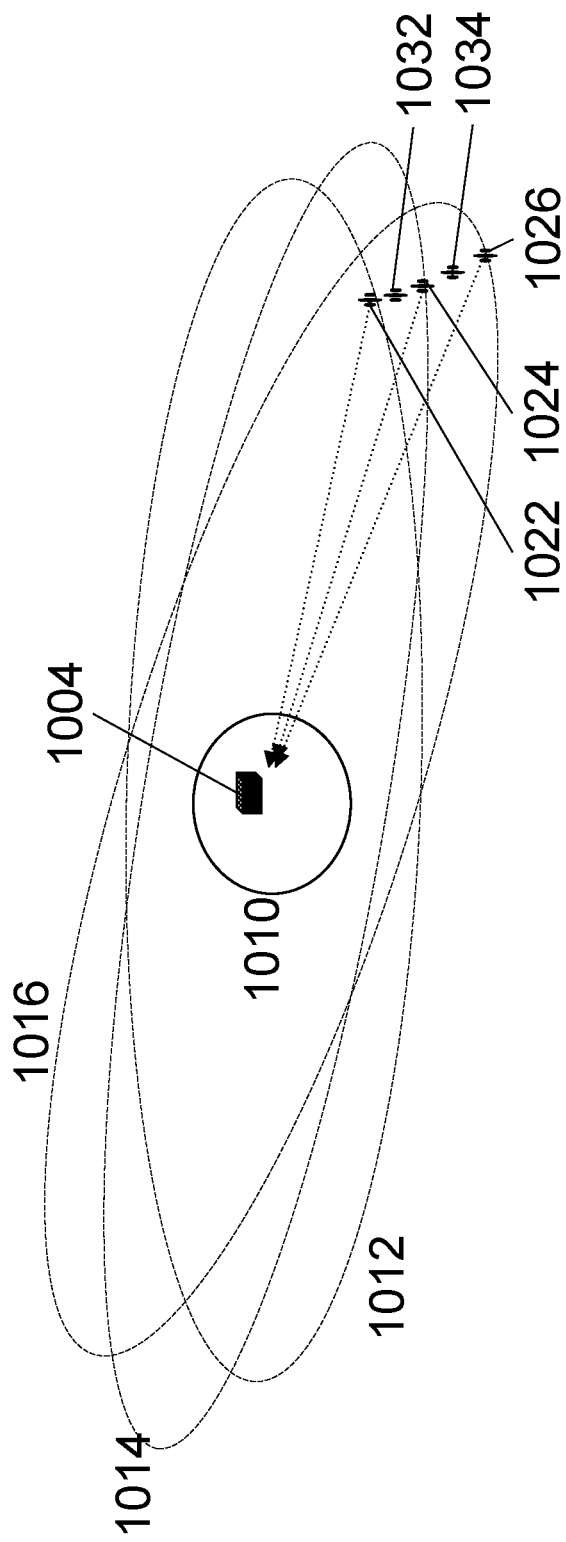
FIG. 1B depicts a data destination 1004 on earth ground 1010 and 5 relaying satellites 1022, 1024, 1026, 1032, and 1034, moving in different slightly inclined Geostationary-Satellite-Orbit (GSO) orbits 1012, 1014, and 1016, and forming a dynamic cluster centered on a GSO orbital slot, in accordance with one embodiment of the invention.

FIG. 1B depicts a concept of parallel communications links from multiple (5) transponding satellites 1022, 1024, 1026, 1032, and 1034 in their corresponding slightly inclined GSO orbits, which include orbits 1012, 1014, and 1016, to a destination 1004 on or near the surface of the earth 1010. The first satellite 1022 is moving in the first slightly inclined GSO orbit 1012, which is a 24-hour geosynchronous orbit. Similarly, the second and the third satellites 1024 and 1026 are moving in the second and the third slightly inclined GSO orbits 1014 and 1016, which are also 24-hour geosynchronous orbits. The fourth and the fifth satellites 1032 and 1034 are moving in the corresponding $4^{th}$ and the $5^{th}$ slightly inclined GSO orbits which are not shown in the figure.

Figure 1C:
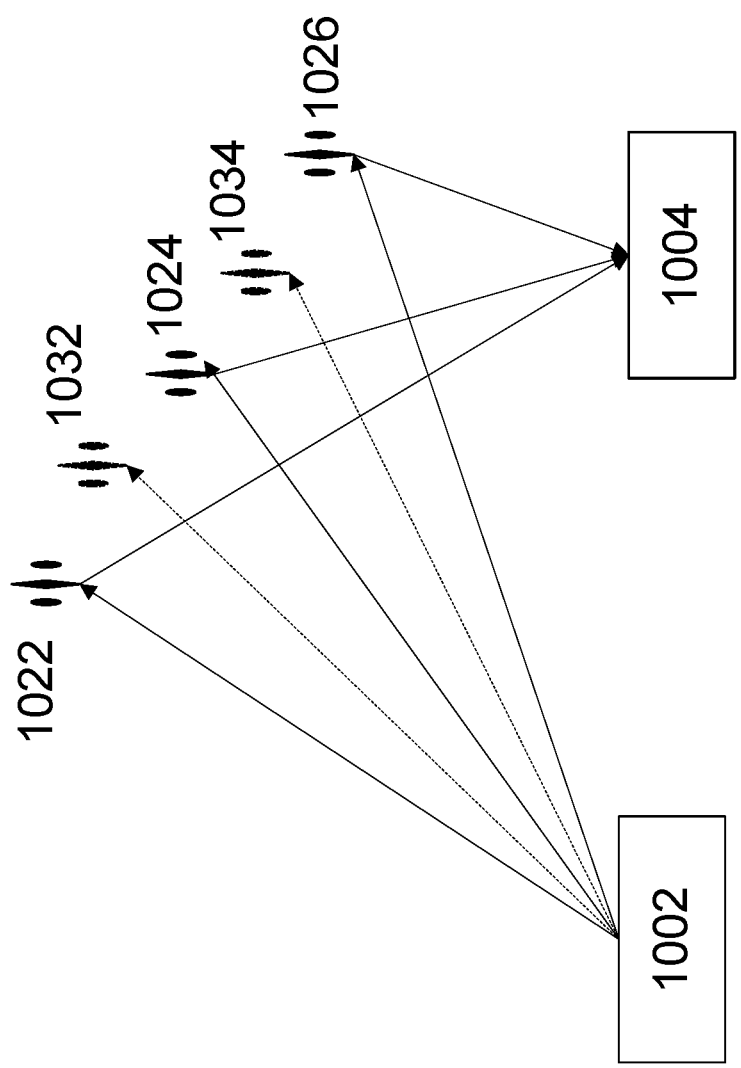
FIG. 1C depicts a relative functional geometry of a data source 1002 and a data destination 1004 on earth ground 1010 and a cluster of 5 relaying satellites in slightly inclined GSO orbits 1012, 1014, and 1016, in accordance with one embodiment of the invention.

FIG. 1C depicts a relative functional geometry of multiple data links between a data source 1002 and a data destination 1004 on earth ground via a cluster of the 5 relaying satellites 1022, 1032, 1024, 1034, and 1026 in slightly inclined GSO orbits.

At the source 1002, a customized data structure for a data stream with a data rate R is formed in a K-muxing processor in generating 5 K-muxed data streams with a data rate of R/4 each. Each of the 5 K-muxed data stream is sent to a relaying satellite accordingly. At the destination 1004, after signal reception and demodulation, the 5 K-muxed data streams relayed by the 5 satellites are transformed by a corresponding K-demuxing process to reconstitute the original data stream.

Figure 2:
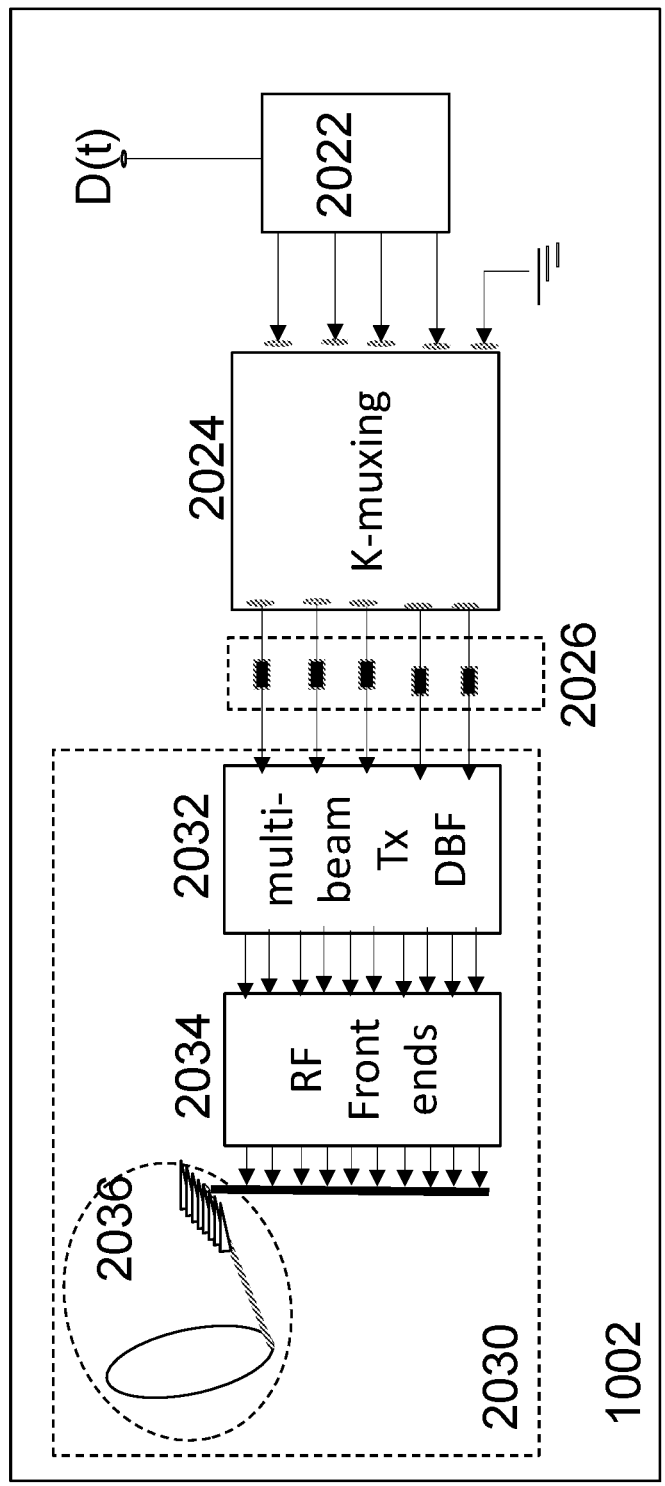
FIG. 2 depicts a block diagram of a multibeam VSAT terminal with a smart 5-beam antenna 2030 in a transmitting mode in accordance with one embodiment of the invention.

Multiple data streams from a data source 1002 on or near the surface of earth 1010 are sent to the dynamic cluster of relaying satellites 1022, 1024, 1026, 1032, and 1034 via a multiple (M=5) beam ground terminal. FIG. 2 depicts a block diagram of a M-beam transmitter at a data source 1002, where M=5. There are three major blocks: a segmenting device 2022, a preprocessor 2024 performing a 5-to-5 K-muxing transform, and a smart 5-beam antenna 2030. The input to the segmenting device 2022 is connected to a data stream D(t). The outputs are 4 data substreams: $D1(t)$, $D2(t)$, $D3(t)$, and $D4(t)$.

They are connected to first 4 inputs of a 5-to-5 K-muxing transform in the preprocessor 2024. The 5-to-5 K-muxing transform features 5 inputs and 5 outputs. The $5^{th}$ input is "grounded", or a null data stream with a zero value in all its data samples. The null data stream is denoted as Nu(t).

The 5 outputs of the 5-to-5 K-muxing transform are K-muxed data streams calculated via the following equations:

$$k1(t)=W11*D1(t)+W12*D2(t)+W13*D3(t)+W14*D4(t)+W15*Nu(t) \quad (1a)$$

$$k2(t)=W21*D1(t)+W22*D2(t)+W23*D3(t)+W24*D4(t)+W25*Nu(t) \quad (1b)$$

$$k3(t)=W31*D1(t)+W32*D2(t)+W33*D3(t)+W34*D4(t)+W35*Nu(t) \quad (1c)$$

$$k4(t)=W41*D1(t)+W42*D2(t)+W43*D3(t)+W44*D4(t)+W45*Nu(t) \quad (1d)$$

$$k5(t)=W51*D1(t)+W52*D2(t)+W53*D3(t)+W54*D4(t)+W55*Nu(t) \quad (1e)$$

In a vector form, the 5 K-muxed data streams $k1(t)$, $k2(t)$, $k3(t)$, $k4(t)$, and $k5(t)$ are in the vector $\underline{KN(t)}=[k1(t), k2(t), k3(t), k4(t), k5(t)]^T$ and $$\underline{KN(t)}=[W]*\underline{DN(t)} \quad (1)$$

where [W] is a 5-by-5 weighting matrix with 25 weights W11, W12, W54, and W55; and $\underline{DN(t)}=[D1(t), D2(t), D3(t), D4(t), D5(t)]^T$ where D5(t) is set to be the null data stream Nu(t).

It is noted that the first K-muxed data stream $k1(t)$ is a first linear combination of all 4 data substreams $D1(t)$, $D2(t)$, $D3(t)$, and $D4(t)$. Similarly, the second, the third, the fourth, and the fifth K-muxed data streams $k2(t)$, $k3(t)$, $k4(t)$, and $k5(t)$ are results from unique but different linear combinations of $D1(t)$, $D2(t)$, $D3(t)$, and $D4(t)$. Consequently, each of the 5 K-muxed data streams exhibits features of self-jamming effects among the 4 data substreams $D1(t)$, $D2(t)$, $D3(t)$, and $D4(t)$, and becomes incomprehensible.

Five K-muxed data streams are generated by the K-muxing transform in the preprocessor 2024 to represent 4 data substreams $D1(t)$, $D2(t)$, $D3(t)$, and $D4(t)$. These K-muxed data streams as a whole are representing the original data stream D(t), and can be viewed as in a multi-dimensional data structure. In this case, the 5 K-muxed data streams are the components of a 5-dimensional data structure for the data stream D(t). These 5 K-muxed data streams will be used during data transport through 5 parallel paths via a cluster of 5 relaying satellites. As a result, there is a 5-for-4 redundancy built-in in the 5 independent satellite routes.

A data substream D1(t), D2(t), D3(t), or D4(t) can be reconstituted when any 4 of the 5 K-muxed data streams become available at a data destination 1004. In fact, the original data stream D(t) can be fully recovered through reconstitution of the 4 data substreams and a de-segmenting device in a receiver at the data destination 1004. These reconstituting procedures for the 4 data substreams D1(t), D2(t), D3(t), or D4(t) can be performed through a K-demuxing transform when any 4 of the 5 K-muxed data streams are captured and become available at the data destination.

Since applications of K-demuxing transform on data redundancy, data privacy, and data validations for data storage and transport have been discussed extensively in many of the listed references, we will not discuss this topic further in this application.

Mathematically, a well-selected weighting matrix [W] shall be a full rank matrix with an existing inverse matrix. For embodiments with M available relaying satellites drifting slowly in a dynamic cluster, well-selected weighting matrix [W] featuring good computational efficiencies are M-to-M orthogonal matrices, where $[W][W^T]=[W^T][W]=[I]$, [I] being an identity matrix, and $[W^{-1}]=[W^T]$. As far as a source 1002 and destination 1004 on ground earth 1010 are concerned, the viewing directions to the relaying satellites are dynamic. The number of available relaying satellites in the dynamic cluster will change in different times of a day, say, from M=5 to M=4. The weighting matrices of the M-to-M K-muxing transforms in various terminals at the source 1002 and the destination 1004 shall be altered accordingly. Options for the selected weighting matrices may comprise any M-to-M orthogonal matrices such as the discrete Fourier Transform (DFT) matrices, the discrete Hartley transform (DHT) matrices, or others. When $M=2^q$, where q is a positive integer, options for weighting matrices may comprise the Fast Fourier Transform (FFT), the transform, the Walsh transform, the Fast Hartley Transform (FHT), or other matrices with more computation efficiencies.

In a transmitter at the data source 1002 in FIG. 2, the 5 K-muxed data streams k1(t), k2(t), k3(t), k4(t), and k5(t) are converted to 5 K-muxed signal streams Sk1(t), Sk2(t), Sk3(t), Sk4(t), and Sk5(t) individually by a bank of modulators 2026 before being sent to a smart 5-beam antenna 2030.

The data stream D(t) from the data source 1002 will be sent to the cluster of relaying satellites 1022, 1024, 1026, 1032, and 1034 in forms of radiated K-muxed signal streams Sk1(t), Sk2(t), Sk3(t), Sk4(t), and Sk5(t) via a smart 5-beam antenna 2030 in a transmitting mode in a common RF (radiofrequency) frequency slot. The smart 5-beam antenna 2030 comprises three major blocks: a digital beam forming (DBF) network 2032, a bank of RF front-ends 2034, and a reflector antenna 2036. In forming a first shaped beam for the smart 5-beam antenna 2030, the DBF network 2032 will continuously replicate a first K-muxed signal stream, Sk1(t), into $N_e$ copies, where $N_e$ is the number of the feed array elements associated with the reflector antenna 2036. Each copy in a complex format with I/Q components will be assigned to an array element channel individually after being weighted or multiplied by a weighting parameter with I/Q components. A first beam weight vector (BWV) featuring $N_e$ weighting parameters in an I/Q format will shape a radiated beam by a reflector antenna 2036 with $N_e$ feed array elements placed on a focal plane of the reflector. The weighted first K-muxed signal streams are distributed in a first set of $N_e$ element channels.

A BWV for a reflector antenna 2036 with a feed array is highly dependent on the reflector geometry, as well as locations and sizes of the feed array elements. The first BWV used in the DBF network 2032 shall correspond to a first radiating beam with a beam peak at the direction of a first relay satellite. The BWV for a first shaped beam is indexed as $BWV_1$. By numerically changing $BWV_1$ in the DBF network 2032, the beam shape of the first shaped beam radiated by the reflector antenna 2036 will be altered.

There are 5 BWVs used in the DBF network 2032 for 5 concurrent beams radiated by the reflector antenna 2036 pointing at various directions. Each of the 5 BWVs is a vector with $N_e$ complex components, where $N_e$ is the number of the feed array elements in the reflector antenna 2036. Similarly, in shaping a second transmitting beam to be radiated by the reflector antenna 2036, the DBF network 2032 will continuously replicate a second K-muxed signal stream, Sk2(t), into $N_e$ copies in a complex format with I/Q components. They are placed in a second set of element channels after being weighted by a second beam weight vector $BWV_2$. The weighted second K-muxed signal streams are distributed in a second set of $N_e$ element channels.

In shaping five concurrent transmitting beams to be radiated by the reflector antenna 2036, the DBF network 2032 shall generate concurrently five groups of weighted K-muxed signal streams. A group of weighted $3^{rd}$ K-muxed signal streams is distributed in a $3^{rd}$ set of $N_e$ element channels. So are the groups of weighted $4^{th}$ and $5^{th}$ K-muxed signal streams distributed in a $4^{th}$ and a $5^{th}$ set of $N_e$ element channels, respectively. The 5 sets of $N_e$ element channels are "indexed" or assigned to 5 sets of weighted K-muxed signal streams.

An output manifold of the DBF network 2032 for multiple (M=5) concurrent beams is configured to have $N_e$ outputs for feeding the $N_e$ feed array elements in the reflector antenna 2036. The output manifold comprises $N_e$ sets of 5-to-1 combiners, and can be implemented in a programmable digital device, a block of processing software in a FPGA/DSP, or a hardwired device in the DBF network 2032. The $i^{th}$ output of the output manifold is a combined signal stream from the $i^{th}$ 5-to-1 combiner to feed the $i^{th}$ feed array element, and comprises the sum of the 5 weighted K-muxed signal streams in the $i^{th}$ element channels from the 5 sets of $N_e$ element channels, where i ranges from 1 to $N_e$.

The $N_e$ element outputs from the output manifold in the DBF network 2032 are filtered and amplified in a bank of RF front-ends 2034 individually before radiated by the reflector antenna 2036. The bank of RF front-ends 2034 comprises $N_e$ channels of conditioning and amplifying. Each channel performs the functions of digital-to-analog (D/A) conversion, frequency up-conversion, RF filtering, power amplification, and others.

The reflector antenna 2036 is configured to support 5 dynamic transmitting (Tx) beams concurrently. It has a reflector and a feed array with $N_e$ elements. Each Tx beam is shaped using a given reflector geometry and the given relative positions of the feed array elements. The beam shaping process performed in the DBF network 2032 for a $j^{th}$ beam is accomplished by varying amplitudes and phases of the radiated element signals from the $N_e$ feed array elements under multiple performance constraints for the $j^{th}$ beam. For instance, a second Tx beam is shaped for a beam peak at the $2^{nd}$ satellite 1024 direction, and 4 nulls pointing at the directions of the $1^{st}$, $3^{rd}$, $4^{th}$ and $5^{th}$ satellites 1022, 1026, 1032 and 1034. As the 5 satellites 1022, 1024, 1026, 1032, and 1034 slowly move in their corresponding orbits, the beam shape of the second beam shall be continuously altered accordingly.

In many embodiments, the feed array elements are usually placed on the focal plane of a parabolic reflector in forming multiple concurrent beams. This geometry, referred to as "reflector with focal plane feeds", can be configured efficiently in forming multiple concurrent beams, by connecting radiated signals to one feed array element only per beam. With $N_e$ feed array elements, the reflector antenna 2036 can support $N_e$ fixed beams concurrently. The reflector geometry with $N_e$ focal plane feeds can also be configured to form a scanning beam via a switching network connected to the $N_e$ feed elements. This reflector geometry may be configured to from dynamic shaped beams with digital beam forming networks, such as shaped contour beams or a set of orthogonal beams.

In other embodiments, the feed array elements are placed slightly off from the focal plane of a parabolic reflector in forming multiple concurrent beams. The offset distance, δ, from the focal plane is usually kept in less than a couple of wavelengths. In one embodiment, at least one of the feed elements is located at an offset distance from the focal plane of the reflector of more than one wavelength. In Ku-band, the maximum δ is usually set at ±2 inches. This geometry, usually being combined with digital beam networks, can be configured in forming concurrent shaped beams with higher degrees of freedom in optimizing desired beam shapes. It also offers better redundancy to allow features of graceful degradation and re-configurability of the reflector antenna 2036. This reflector geometry may be configured and/or re-configured efficiently to form dynamic shaped beams with digital beam forming networks, such as shaped contour beams or a set of orthogonal beams.

In some embodiments, the reflector antenna 2036 supports additional diagnostic beams. Many diagnostic beams are receiving agile beams which are hopping over multiple beam positions for estimating relative directions of targeted satellites and other information on self-awareness for the data source 1002. Diagnostic beams are discussed further in FIG. 2A.

Figure 2A:
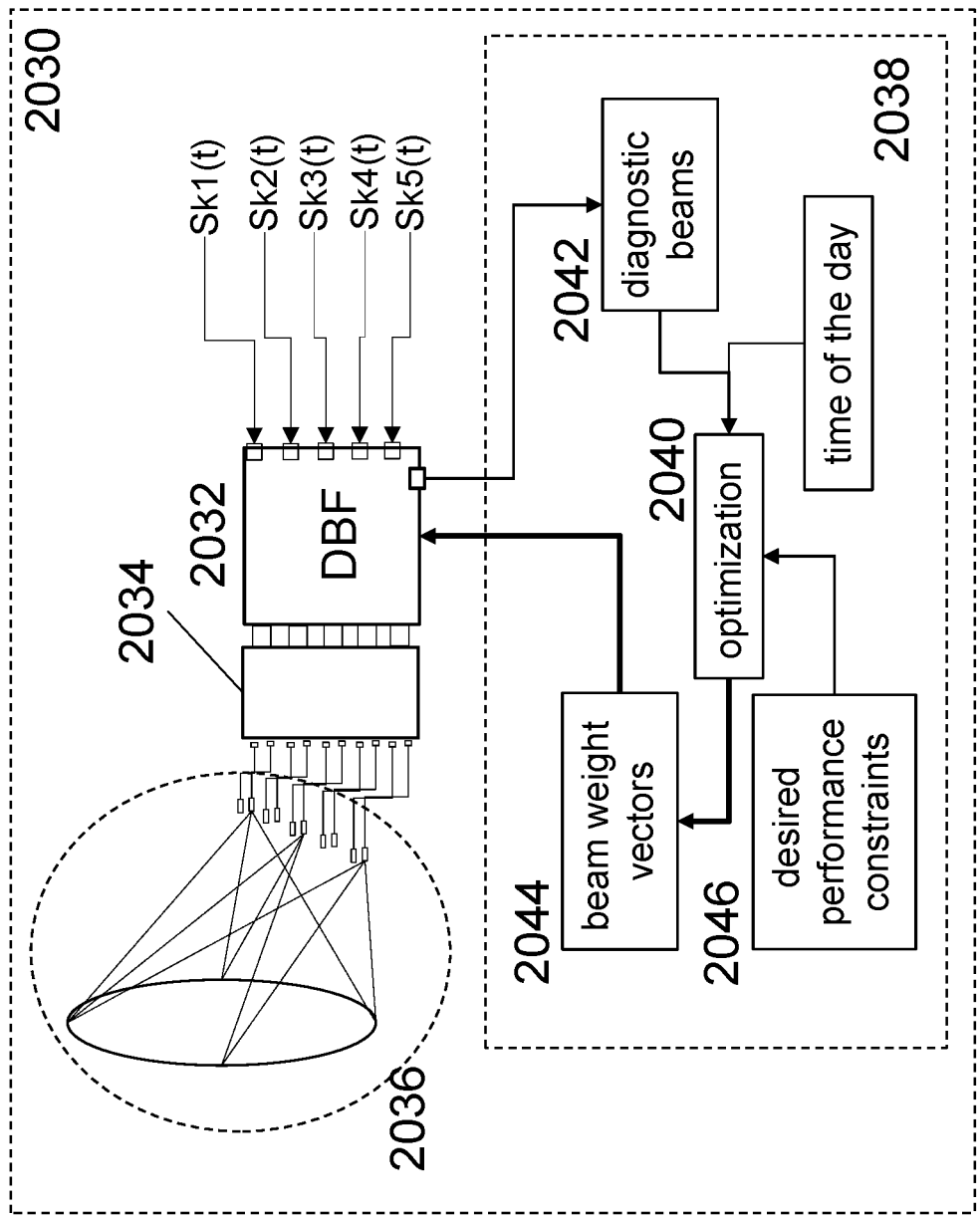
FIG. 2A depicts a block diagram of a smart 5-beam antenna 2030 with a controller in a transmitting mode in accordance with one embodiment of the invention.

FIG. 2A depicts a block diagram of the smart 5-beam antenna 2030 in more details. In a transmitting mode for many embodiments, the inputs are 5 K-muxed signal streams Sk1(t), Sk2(t), Sk3(t), Sk4(t), and Sk5(t), and the outputs are 5 radiated RF beams delivering the 5 K-muxed signal streams Sk1(t), Sk2(t), Sk3(t), Sk4(t), and Sk5(t) in a RF frequency slot to the 5 satellites 1022, 1024, 1026, 1032, and 1034 in a dynamic cluster. The 5 satellites are drifting slowly in various slightly inclined GSO orbits. A controller 2038 will dynamically control the pointing directions and the beam shapes of the 5 radiated RF beams via the 5 beam weight vectors; $BWV_1$, $BWV_2$, $BWV_3$, $BWV_4$, and $BWV_5$. Thus the 5 BWVs are changed slowly according to the 5 dynamic satellite directions in a 24-hour periodic timeline. It is adequate for fixed ground terminals to update the BWVs every 10 to 30 minutes. Less than 800 entries are required for all possible BWV values per beam in a 24-hour timeline.

Assuming (1) $N_e$ elements in a feed array for the reflector antenna and a largest possible $N_e$ set at 20, and (2) 32 bits or 4 bytes per I/Q complex number, a BWV entry requires 20×4 bytes. In addition, over a 24-hour period, there are in total 720 possible BWV values for 5 beams for a scenario wherein the 5 BWVs are updated every 10 minutes. A lookup table using a 60-Kbyte digital memory shall be more than adequate. Table look-up methods based on a local timeline in the controller 2038 are very cost-effective for fixed ground terminals in updating the 5 BWVs.

In other embodiments, the controller 2038 in the smart 5-beam antenna 2030 either on a fixed or a mobile/relocatable ground terminal calculates the BMWs 2044 to be updated in real time. The controller 2038 utilizes data collected by diagnostic beams 2042 in estimating relative directions of targeted satellites 1022, 1024, 1026, 1032, and 1034 in a dynamic cluster and other information on self-awareness. The diagnostic beams 2042 are mostly receiving agile beams which are hopping over multiple beam positions. An optimization processor 2040 calculates new BWVs 2044 for the 5 tracking beams to be used by the DBF network 2032 in next updates. Desired performance constraints 2046, collected information and data by the diagnostic beams 2042, and local time of the day are inputs to the optimization processor 2040.

Among other optimization boundaries, desired performance constraints 2046 comprise number of shaped beams, beam peak directions, minimum peak gains in dB of shaped beams, relative null directions relative to beam peaks, suppression levels for directional nulls in dB, sidelobe levels, minimum gain in dB for contour beams, and suppression levels in dB beyond desired coverage, and others.

Various cost functions are generated and quantified based on differences between many desired performance constraints 2046 and corresponding current performance measurements. Cost functions are positively defined and shall be zero or a positive real number. Every observation sample in reflector antenna performance evaluations relative to a performance constraint is numerically mapped to a cost function. There may be tens, hundreds or thousands of observation samples during an iteration cycle in the optimization processor 2040. Some cost functions may be defined through ranking procedures on current observations relative to various performance indexes.

Current total cost shall also be positively defined, and is estimated by summing all cost functions numerically from associated observations. When performance measurements and/or simulated results of the smart 5-beam antenna 2030, also referred to as the multibeam tracking antenna 2030, meets all desired performance constraints 2046, the current total cost shall be zero.

The current total cost is a quantified performance index for a smart 5-beam antenna 2030 with a DBF network 2032 under current BWVs. A very small positive number, referred to as a convergent threshold, is chosen in an optimization run. When the total cost becomes non-zero but less than the convergent threshold, the corresponding 5 current BWV's are nearly adequate. The performance measurements/simulations of the associated smart 5-beam antenna 2030 with current BWVs can meet most of desired performance constraints or specifications. It shall indicate that the small negative performance deviations are acceptable.

The 5 concurrent beams generated by the smart 5-beam antenna 2030 shall be configured and optimized individually. The optimization processor 2040 comprises 5 independent iterative loops. The first loop is to minimize the current total cost value of the antenna configuration associated with $BWV_1$. A gradient of the total cost can be measured with respect to all $N_e$ complex components of the $BWV_1$ via perturbation and/or correlation techniques. A steepest descent method in calculating a new BWV$_1$ 2044 for the next updating cycle utilizes the estimated gradient of the total cost with respect to all N$_e$ components in the BWV$_1$. The iteration converges when the current total cost becomes less than a chosen convergent threshold. The 5 iteration loops for the five beams shall yield optimized BWVs 2044 for the next updates in the DBF network 2032.

In other embodiments, optimization processors are configured to use convex optimization techniques calculating optimized BWVs directly.

Figure 3:
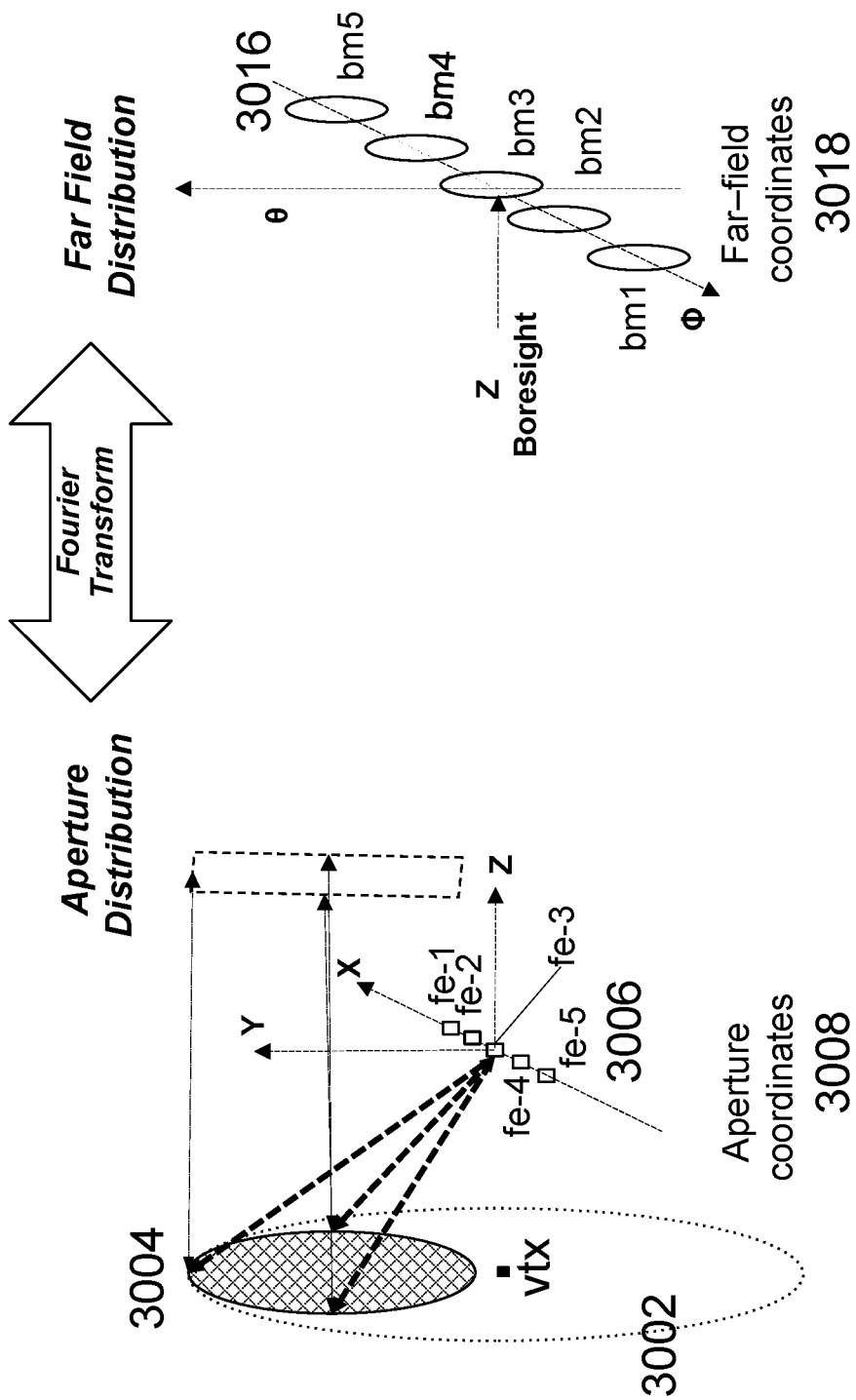
FIG. 3 depicts coordinates of a multibeam reflector antenna 2036, its feed-array elements 3006, and those of associated radiations in far field 3016 in accordance with one embodiment of the invention.

FIG. 3 depicts a simplified operation concept of a multibeam reflector antenna 2036. It comprises an offset reflector 3004 and a feed array 3006 with 5 feed elements. The positions of the first, the third, and the 5$^{th}$ feed elements are indicated by small squares as fe-1, fe-3, and fe-5 in the figure. The aperture sizes of these 5 elements of the feed array 3006 are not shown in the figure.

The offset reflector 3004 is a circular cut from a parent paraboloid reflector 3002. Its vertex is marked in the figure by a small solid square with the "vtx" symbols. The origin of the "aperture coordinates" 3008 is placed at the reflector focus and the z-axis is in line with the focal axis of the reflector 3002. The focal axis of a reflector is parallel to the direction connecting its vertex and its focus, and is identical to its boresight direction in far field. RF radiations from the focus of a parabolic reflector will be directed to its boresight direction in far field.

The focus of the offset reflector 3004 is placed at x=0, y=0, and z=0. The offset direction of the offset reflector 3004 is at positive y-direction and the feed array 3006 with 5 feed elements is placed on the x-axis with the 3$^{rd}$ feed element (fe-3) on the focus. The 3$^{rd}$ feed element, fe-3, is oriented to point at the center of the offset reflector 3004. The 5 feed array elements fe-1, fe-2, fe-3, fe-4, and fe-5 are all placed on the focal plane of the offset reflector 3004. The focal plane of the offset reflector 3004 is defined as the plane passing through the focus with a surface normal pointed to the center of the offset reflector 3004.

Electric field distributions or power distributions of antenna radiation patterns are usually presented in spherical coordinates. FIG. 3 depicts footprints of 5 spot beams along the Φ axis schematically. The 5 footprints 3016 on the Φ axis in the far-field coordinates are results of placing the 5 elements of the feed array 3006 on the x-axis in the aperture coordinates. The first spot beam with a beam peak at the direction of footprint bm1 in the far field is highly correlated to the position of the first feed element fe-1 on the focal plane of the offset reflector 3004. So are the other 4 spot beams pointed at the directions of footprints bm2, bm3, bm4, and bm5 highly related to the positions of the corresponding feed elements fe-2, fe-3, fe-4, and fe-5, respectively. The third feed fe-3 is on the focus of the offset reflector 3004 and its corresponding spot beam features a footprint centered on the direction of bm3, which is the focus axis or the boresight direction of the offset reflector 3004. The spot beam pointed at bm3 is also known as the boresight beam.

In FIG. 4, FIG. 5, FIG. 6, and FIG. 7, we will show simulated radiation patterns of conventional spot beams, and shaped spot beams using performance constraints of orthogonal beam (OB) radiation patterns based on geometry of 5 feed elements on a focal plane similar to that depicted in FIG. 3.

Figure 4:
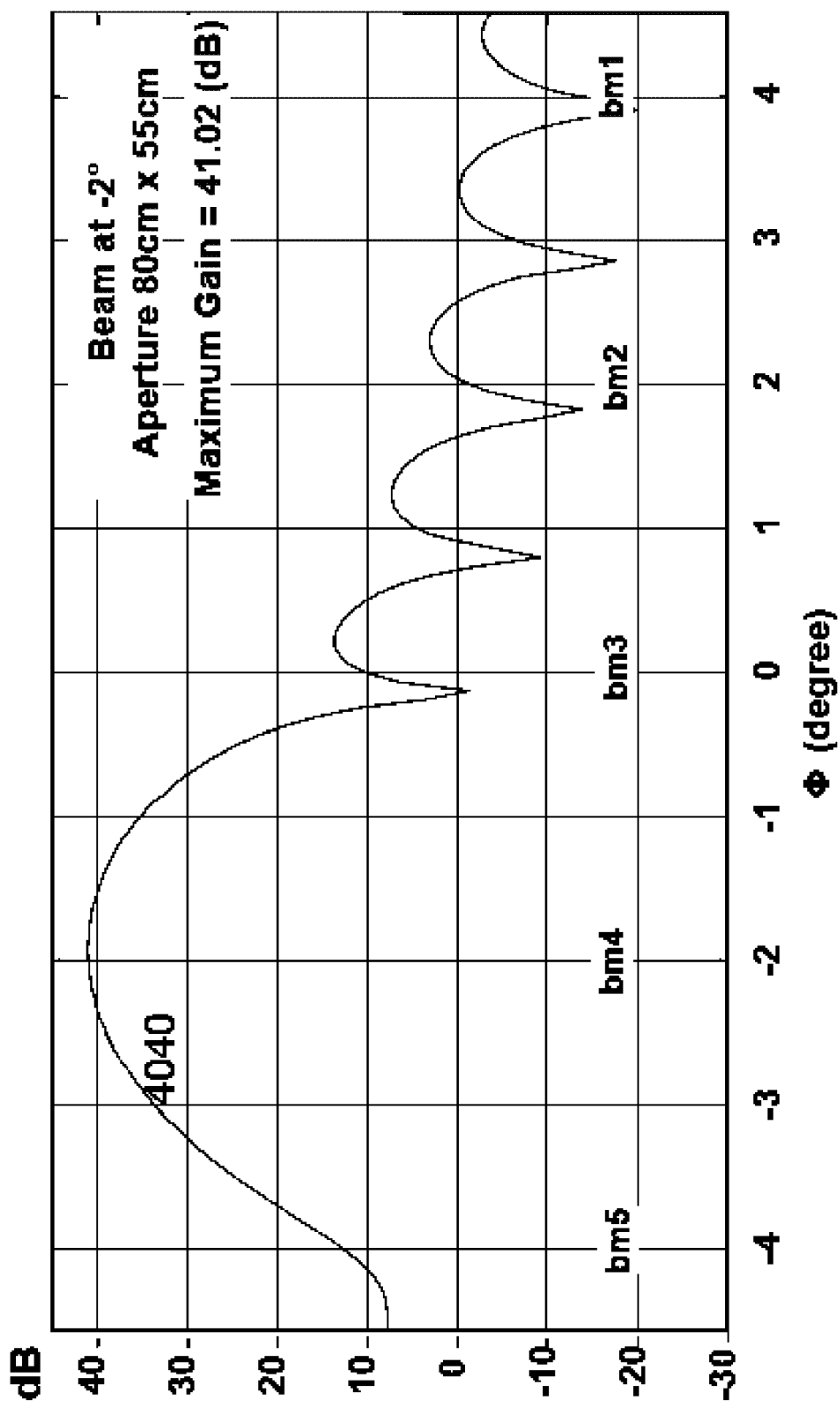
FIG. 4 depicts a radiation pattern 4040 of a conventional spot beam in far field from a multibeam reflector antenna 2036 in accordance with one embodiment of the invention.

FIG. 4 depicts a conventional spot beam radiation pattern 4040 at 18 GHz in Ka-band using an optimally designed 4$^{th}$ feed element fe-4 only. The offset reflector 3004 in the simulations has a projected elliptical aperture at 80 cm×55 cm. We anticipate in simulations that there is a total of 5 conventional spot beams pointed to 5 closely spaced satellites with angular separations in the Φ direction. Each spot beam is generated by an individually optimized feed element. In the simulations, the 5 desired beam peaks are, respectively, at Φ=4°, 2°, 0°, −2°, and −4° and are marked by the symbols of bm1, bm2, bm3, bm4, and bm5 in FIG. 4. These 5 beam peaks simulate a multibeam capability to concurrently point to 5 slow moving satellites 1022 1032, 1024, 1034, and 1026 in a cluster with adequate mutual interference rejections.

A radiation pattern cut at θ=0° of an antenna is a one-dimensional (1-D) radiation pattern, which displays the antenna directional gain in dB as a function of directional angle Φ. A vertical axis is in a dB scale, with the 0 dB at a referenced power level generated by an isotropic radiator.

The peak of the 4$^{th}$ spot beam 4040 of the 1-D radiation pattern in FIG. 4 is ~41 dB at Φ=−2° with a 3-dB beamwidth of ~1.5°, as expected. Its first sidelobe level is at 14 dB, or at ~27 dB with respect to the beam peak. The gain levels of the 4$^{th}$ spot beam 4040 at the bm1, bm2, bm3, and bm5 directions are at about −15, −2, +10, and +12 dB, respectively.

Figure 5:
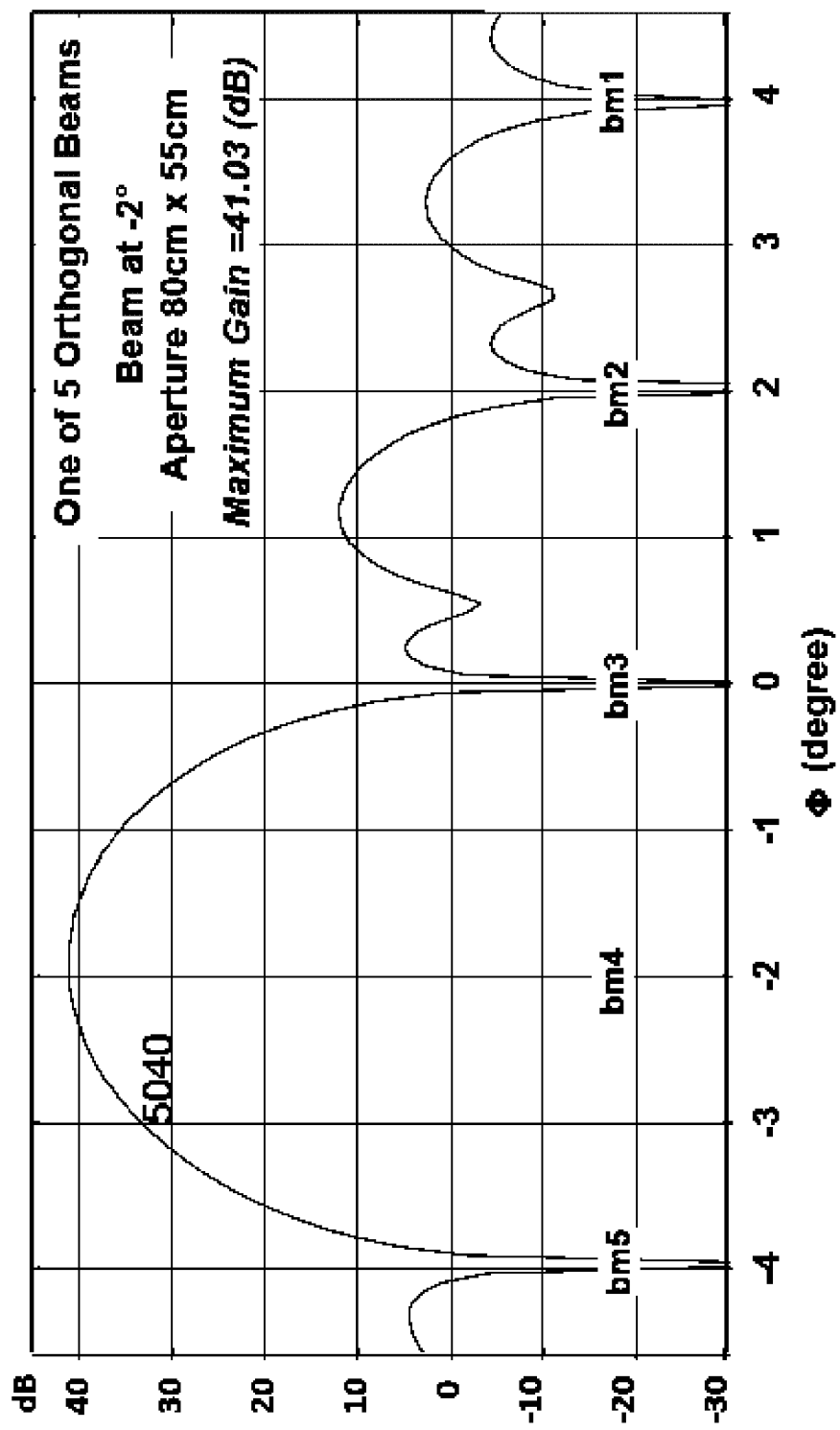
FIG. 5 depicts a radiation pattern 5040 of an orthogonal beam in far field from a multibeam reflector antenna 2036 in accordance with one embodiment of the invention.

FIG. 5 depicts a 1-D radiation pattern from a shaped spot beam at 18 GHz in Ka-band using all 5 feed elements in the feed array 3006. The shaped spot beam radiation pattern is one of 5 shaped beams with orthogonal beam (OB) patterns. Same as those in FIG. 4, the offset reflector 3004 in the simulations has a projected elliptical aperture at 80 cm×55 cm. All other assumptions and display conventions for the simulation results in FIG. 5 are identical to those in FIG. 4.

Simulated radiation gain pattern of a 4$^{th}$ shaped spot beam 5040 in FIG. 5 features a gain peak of ~41 dB at Φ=−2° (the bm4 direction) with a 3-dB beamwidth slightly less than 1.5°. The 4$^{th}$ shaped spot beam 5040 exhibits features of an OB radiation pattern with 4 deep nulls, respectively, at 4°, 2°, 0°, and −4°. The null directions and less than −30 dB null levels are specified in the simulation as parts of the desired performance constraints 2046 of a controller 2038 in FIG. 2A. Its first sidelobe level is at 12 dB, or at −29 dB with respect to the beam peak. The gain levels of the 4$^{th}$ shaped spot beam 5040, or 4$^{th}$ OB beam, at the bm1, bm2, bm3, and bm5 directions are all lower than −30 dB, as expected. The suppression levels in the 4 specified directions bm1, bm2, bm3, and bm5 are better than −70 dB with respect to the beam peak at bm4.

In one embodiment, in forming shaped beams, the feed array 3006 may have more than 5 elements fe-1 to fe-5 in forming a set of 5 shaped beams with OB radiation patterns. In order to gain more design flexibility in beam shaping in a DBF for a multibeam reflector antenna 2036, the area occupied by 5 element apertures on a focal plane may be split into 15 smaller element apertures. In one embodiment, to gain more design flexibility and redundancy in forming 5 shaped beams, additional elements in the feed array 3006, say fe-6 and fe-7, are placed slightly off from a focal plane. In another embodiment, to gain more design flexibility and redundancy in forming 5 shaped beams, 15 feed elements in the feed array 3006 are all placed slightly off from a focal plane.

Figure 6:
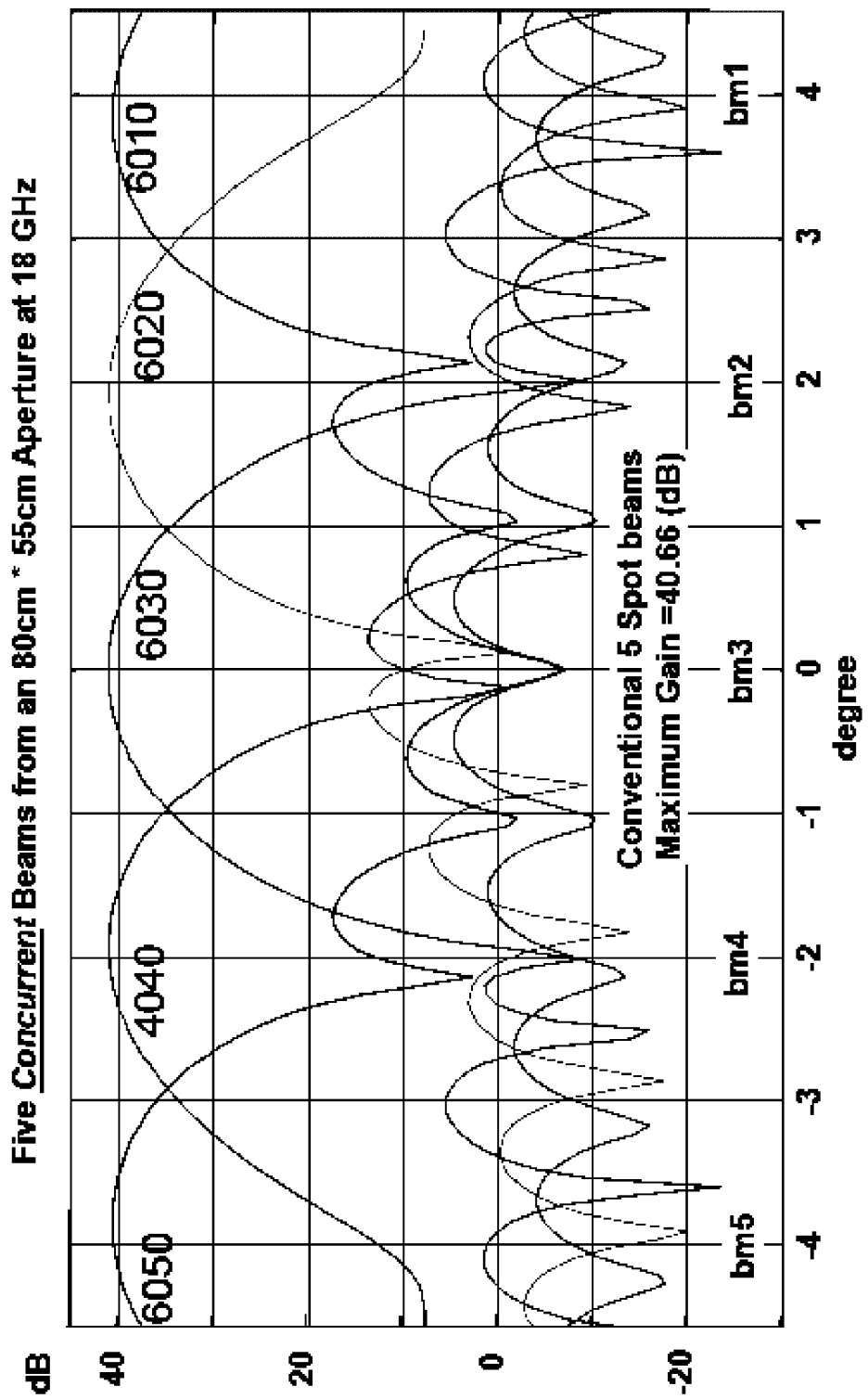
FIG. 6 depicts radiation patterns 6050, 4040, 6030, 6020, and 6010 of 5 contiguous conventional spot beams in far field from a multibeam reflector antenna 2036 in accordance with one embodiment of the invention.

FIG. 6 depicts a set of 5 conventional spot beam radiation patterns 6010, 6020, 6030, 4040, and 6050 at 18 GHz. Each of them results from simulations using only one of 5 optimized feed elements in the feed array 3006. The assumptions and display parameters are identical to those in FIG. 4. The 5 desired beam peak directions are at 4°, 2°, 0°, −2°, and −4° and are respectively indicated by the symbols of bm1, bm2, bm3, bm4, and bm5. The first spot beam 6010 exhibits a peak gain of ~40 dB at Φ=4° (the bm1 direction) with a 3-dB beamwidth of ~1.6°. The antenna gain levels of the first spot beam 6010 are, respectively, 13 dB, −5 dB, −8 dB, and −9 dB at the directions of bm2, bm3, bm4, and bm5. Similarly, the 5$^{th}$ spot beam 6050 exhibits a peak gain of ~40 dB at Φ=−4° (the bm5 direction) with a 3-dB beamwidth of ~1.6°. The antenna gain levels of the 5$^{th}$ spot beam 6050 are, respectively, −9 dB, −8 dB, −5 dB, and 13 dB at the directions of bm1, bm2, bm3, and bm4.

Figure 7:
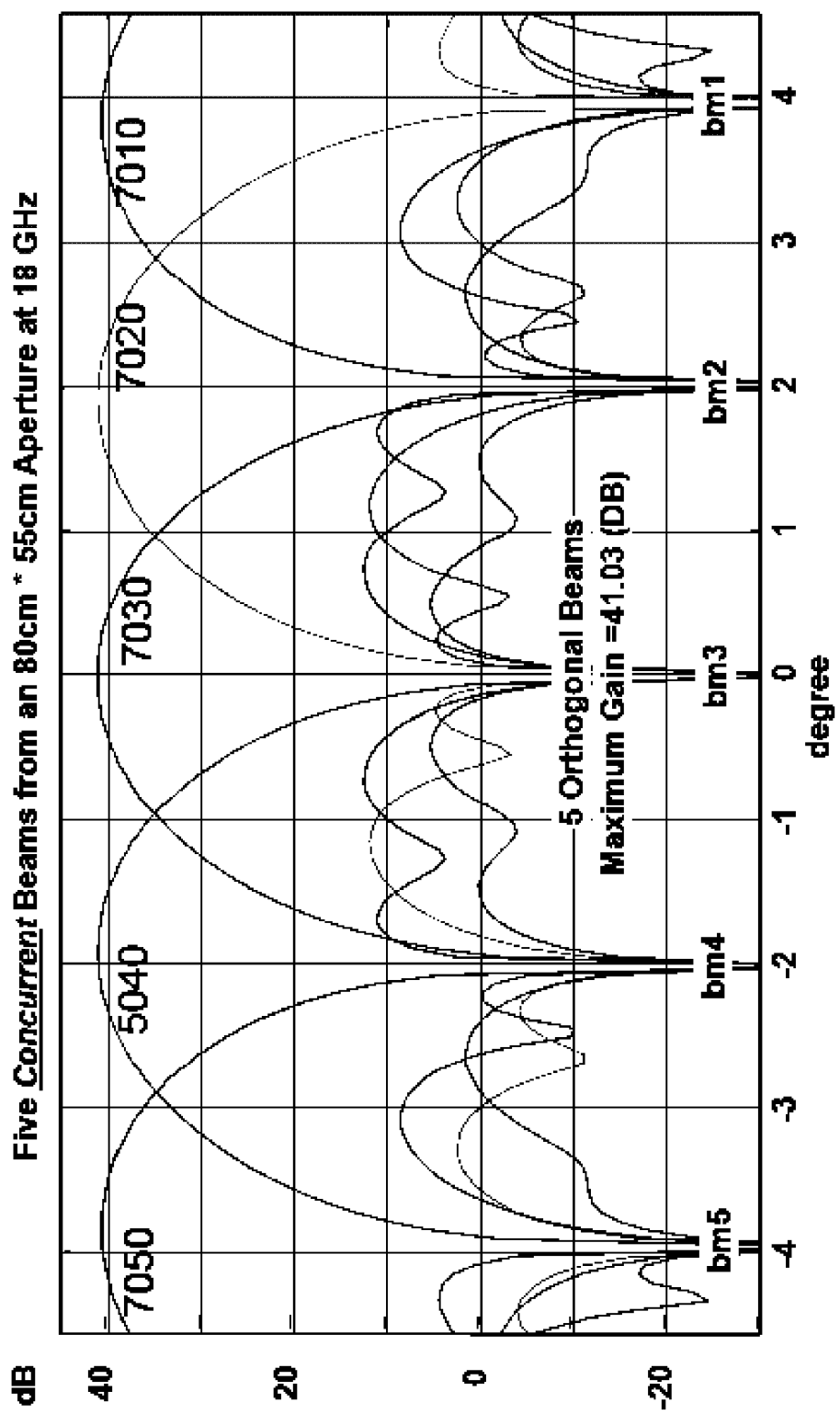
FIG. 7 depicts orthogonal-beam (OB) radiation patterns 7050. 5040, 7030, 7020, and 7010 of 5 contiguous "shaped" spot beams in far field from a multibeam reflector antenna 2036 in accordance with one embodiment of the invention.

FIG. 7 depicts a set of 5 shaped spot beam radiation patterns at 18 GHz 7010, 7020, 7030, 5040, and 7050, each of which is optimized using all 5 feed elements in the feed array 3006. The 5 beams are optimized shape beams under desired performance constraints 2046 of 5 OB radiation patterns. For scenarios of tracking 5 slow-moving satellites individually, the 5 OB beams shall exhibit the following performance features: (1) the beam peak of the radiation pattern of an i$^{th}$ OB beam is always at nulls of other 4 OB beams, and (2) the radiation pattern of the i$^{th}$OB beam exhibits 4 deep nulls at the peak directions of the other 4 OB beams, where i ranges from 1 to 5.

The assumptions and display parameters are identical to those in FIG. 5. The 5 desired beam peak directions are specified at 4°, 2°, 0°, −2°, and −4° and are respectively indicated by the symbols of bm1, bm2, bm3, bm4, and bm5. The first spot beam 7010 exhibits a peak gain of ~40 dB at Φ=4° (the bm1 direction) with a 3-dB beamwidth of ~1.6°. The antenna gain levels of the first spot beam 7010 are all below −30 dB at the directions of bm2, bm3, bm4, and bm5. Similarly, the 5$^{th}$ spot beam 7050 exhibits a peak gain of ~40 dB at Φ=−4° (the bm5 direction) with a 3-dB beamwidth of ~1.6°. The antenna gain levels of the 5$^{th}$ spot beam 7050 are also all below −30 dB at the directions of bm1, bm2, bm3, and bm4.

Embodiment 2

Figure 8:
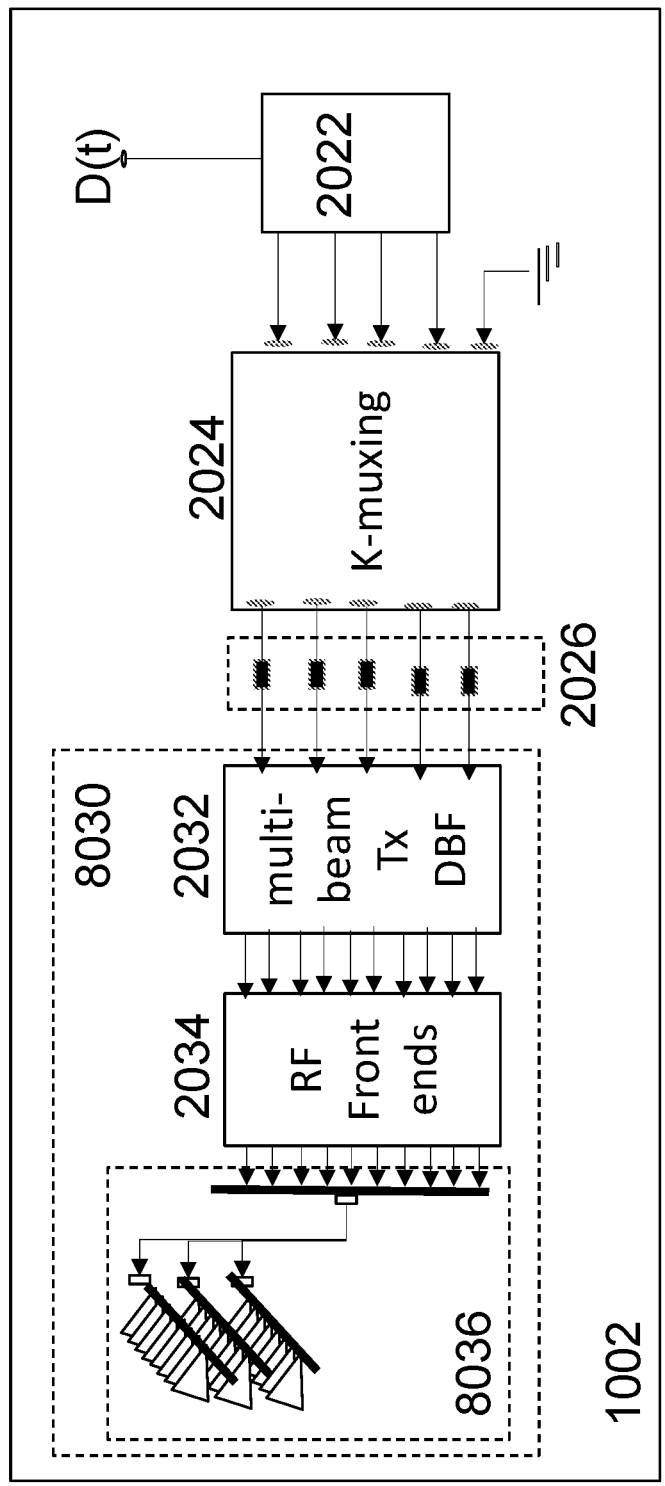
FIG. 8 depicts a block diagram of a multibeam VSAT terminal at a data source 1002 with a phased array antenna 8030 in a transmitting mode in accordance with one embodiment of the invention.

FIG. 8 depicts a block diagram of a M-beam transmitter at a data source 1002, where M=5. The M-beam transmitter is near identical to the one depicted in FIG. 2, except that the smart 5-beam antenna 2030 based on configurations of a reflector antenna 2036 is replaced by a different smart 5-beam tracking antenna 8030 based on configurations of a phased array 8036. The 5-beam transmitter from the data source 1002 is configured to send 5 K-muxed signal streams to a cluster of relaying satellites 1022, 1024, 1026, 1032, and 1034. As far as ground users are concerned, these satellites in the cluster are drifting in various 24-hour locus elongated in North-South directions continuously and slowly. The M-beam transmitter at the data source 1002 has three major blocks: a segmenting device 2022, a preprocessor 2024 performing a 5-to-5 K-muxing transform, and a smart 5-beam antenna 8030 to form one-dimensional (1-D) scanning beams.

The 5-beam tracking antenna 8030 in a transmitting mode comprises three major blocks: a digital beam forming (DBF) network 2032, a bank of RF front-ends 2034, and a phased array antenna 8036. The DBF network 2032 shall have 5 inputs and Ne outputs, where Ne is greater than 10.

As an example, in forming circular beams with ~2° beamwidth by a phased array antenna with 1-D scanning capability, its square antenna aperture size shall be about 35 wavelengths in length and width. Assuming a 0.7 wavelength spacing among adjacent elements, ~2500 elements are needed. However, the array antenna is designed to scan less than ±30° in one direction only, the 2500 elements in the phased array are grouped into 50 subarrays, each of the subarrays having 50 elements. Therefore, to support a phased array in forming multiple beams in the scanning direction only, the associated multibeam DBF 2032 shall have about 50 outputs.

In forming a first shaped beam in supporting the phased array antenna 8036, the DBF network 2032 will continuously replicate a first K-muxed signal stream, Sk1($t$), into Ne copies. Each copy in a complex format with I/Q components will be assigned to a subarray channel individually after being weighted or multiplied by a weighting parameter with I/Q components. A first beam weight vector (BWV) has Ne weighting parameters in an I/Q format. The weighted first K-muxed signal streams are distributed in a first set of Ne subarray channels.

A BMV for a phased array antenna is highly dependent on the geometry, locations and sizes of the array elements, and those of the subarrays. The first BWV shall correspond to a first radiating beam with a beam peak at the direction of a first relay satellite. The BWV for a first shaped beam is indexed as BWV$_1$. By numerically changing BWV$_1$, the beam shape of the first shaped beam can be altered.

The phased array antenna 8036 is configured to support 5 dynamic transmitting (Tx) beams concurrently. The 5-beam DBF network 2032 is configured to support the phased array 8036 with Ne subarrays. Different Ne outputs of the DBF network 2032 shall exhibit Ne different weighted sums of the 5 K-muxed signal streams Sk1($t$), Sk2($t$), Sk3($t$), Sk4($t$), and Sk5($t$). They are Ne unique composited K-muxed signal streams.

The bank of RF front ends 2034 shall have N$_e$ independent channels to condition and amplify the corresponding N$_e$ composited K-muxed signal streams individually. All N$_e$ subarrays in the phased array antenna 8036 are used in shaping each of the 5 transmitting beams with OB radiation patterns. As a result, the 5 K-muxed signal streams Sk1($t$), Sk2($t$), Sk3($t$), Sk4($t$), and Sk5($t$) are delivered via a common RF frequency slot to 5 satellites at different directions with extremely low mutual interferences, for example, −60 dB among them.

Each Tx beam is shaped under a given array geometry, such as relative positions of the feed array elements and those of subarrays. The beam shaping process for a j$^{th}$ beam is accomplished by varying amplitudes and phases of the Ne radiated subarray signals under performance constraints for the j$^{th}$ beam. For instance, a second Tx beam is shaped for a beam peak at the 2$^{nd}$ satellite 1024 direction, and 4 nulls pointing at the directions of the 1$^{st}$, 3$^{rd}$, 4$^{th}$ and 5$^{th}$ satellites 1022, 1026, 1032 and 1034. As the 5 satellites 1022, 1024, 1026, 1032, and 1034 moves in their corresponding orbits, the beam shape of the second beam shall be continuously altered.

Embodiment 3

Figure 9:
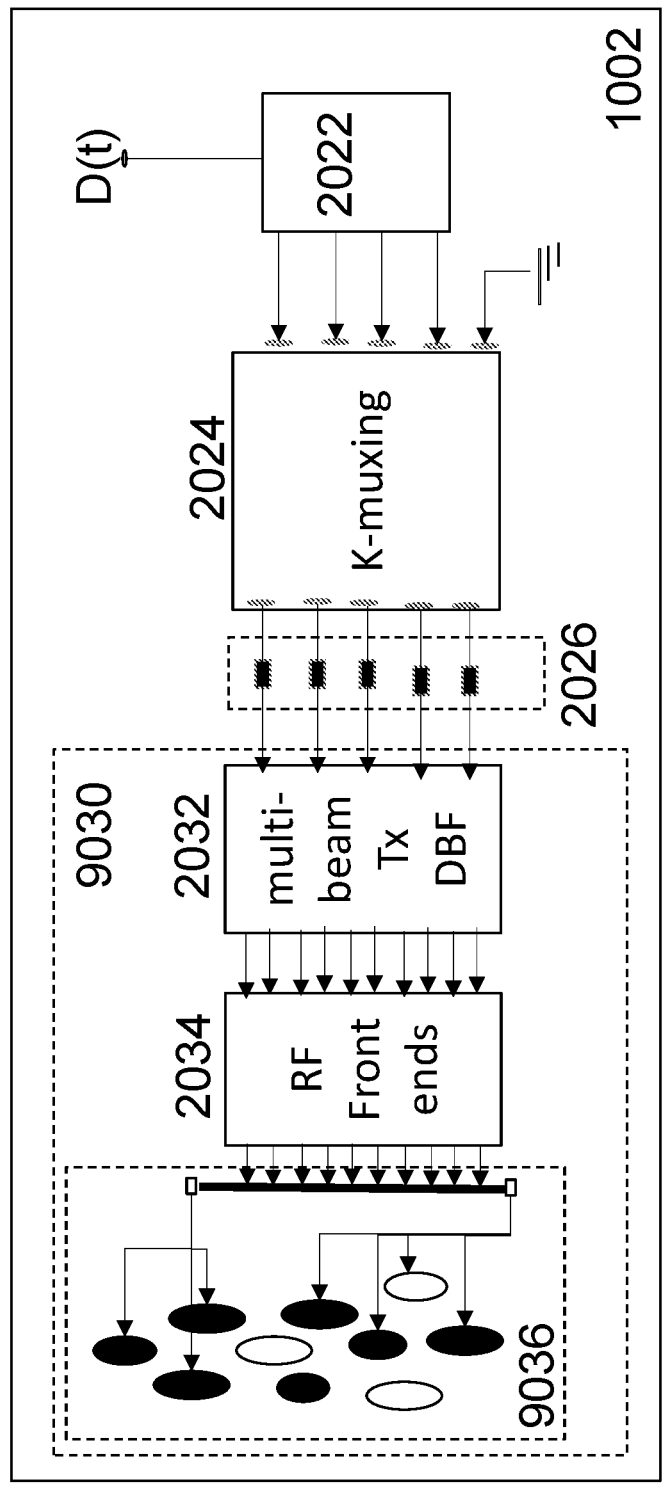
FIG. 9 depicts a block diagram of a multibeam VSAT terminal at a data source 1002 with a sparse array antenna 9030 in a transmitting mode in accordance with one embodiment of the invention.

FIG. 9 depicts a block diagram of a M-beam transmitter at a data source 1002, where M=5. This M-beam transmitter is near identical to the ones depicted in FIG. 2 and FIG. 8, except that the smart 5-beam tracking antenna 9030 is implemented based on configurations of a sparse array antenna 9036. The sparse array antenna 9036 to form M independent tracking beams with OB beam patterns comprises Nge different gimbaled array elements or subarrays, where Nge is greater than M.

The 5-beam transmitter from the data source 1002 is configured to send 5 K-muxed signal streams to a cluster of relaying satellites 1022, 1024, 1026, 1032, and 1034. As far as ground users are concerned, these satellites in the cluster are drifting in various 24-hour locus elongated in North-South directions continuously and slowly. The 5-beam transmitter at a data source 1002 has three major blocks: a segmenting device 2022, a preprocessor 2024 performing a 5-to-5 K-muxing transform, and a smart 5-beam antenna 9030 to form a set of 5 scanning beams with OB radiation patterns. The associated multibeam DBF 2032 shall have Nge outputs.

In forming a first shaped beam in supporting the sparse array antenna 9036, the DBF network 2032 will continuously replicate a first K-muxed signal stream, Sk1($t$), into Nge copies. Each copy in a complex format with I/Q components will be assigned to an array element (or subarray) channel individually after being weighted or multiplied by a weighting parameter with I/Q components. A first beam weight vector (BWV) has Nge weighting parameters in an I/Q format. The weighted first K-muxed signal streams are distributed in a first set of Nge array element (or subarray) channels.

A BMV for a sparse array antenna is highly dependent on the array geometry, such as the locations, the orientations, and the sizes of the gimbaled array elements, and/or those of gimbaled subarrays. The first BWV shall correspond to a first radiating beam with a beam peak at the direction of a first relay satellite. The BWV for a first shaped beam is indexed as $BWV_1$. By numerically changing $BWV_1$, the beam shape of the first shaped beam can be altered under a given array geometry.

The sparse array antenna 9036 is configured to support 5 dynamic transmitting (Tx) beams concurrently. The 5-beam DBF network 2032 is configured to support the sparse array antenna 9036 with Nge gimbaled array elements. Different Nge outputs of the DBF network 2032 shall exhibit Nge different weighted sums of the 5 K-muxed signal streams Sk1($t$), Sk2($t$), Sk3($t$), Sk4($t$), and Sk5($t$). They are Nge unique composited K-muxed signal streams.

The bank of RF front ends 2034 shall have Nge independent channels to condition and amplify the composited K-muxed signal streams individually. All Nge gimbaled array elements or subarrays in the sparse array antenna 9036 are used in shaping each of the 5 transmitting beams with OB radiation patterns. As a result, the 5 K-muxed signal streams Sk1($t$), Sk2($t$), Sk3($t$), Sk4($t$), and Sk5($t$) are delivered via a common RF frequency slot to 5 satellites at different directions with extremely low mutual interferences, for example, −60 dB among them.

Embodiment 4

Figure 10:
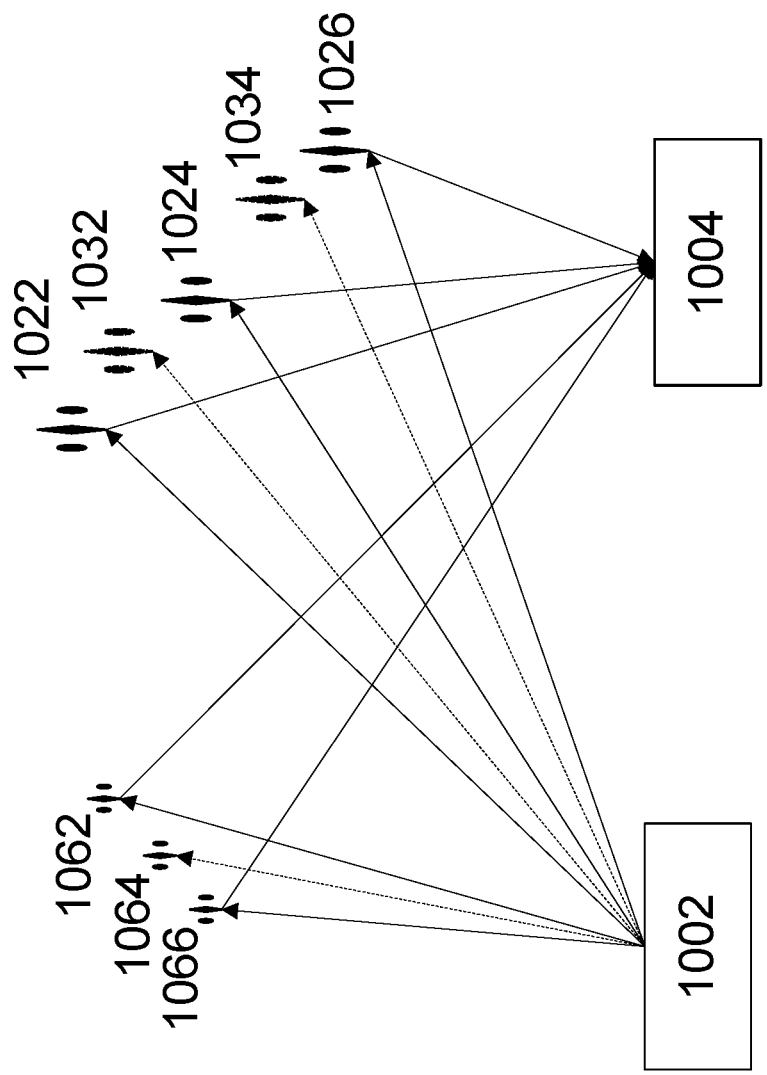
FIG. 10 depicts a block diagram of a multibeam VSAT terminal with a smart multibeam antenna 2030 connecting to 8 satellites concurrently in a transmitting mode in accordance with one embodiment of the invention.

FIG. 10 depicts a relative functional geometry of multiple data links between a data source 1002 and a data destination 1004 on earth ground via a constellation of the 8 relaying satellites 1022, 1032, 1024, 1034, 1026, 1062, 1064, and 1066 in slightly inclined GSO orbits. In some embodiments, the 8-satellite constellation comprises two dynamic clusters of satellites centered on two GSO orbital slots. Let's refer to the two GSO orbital slots as GSO-1 and GSO-2 slots. Their longitudinal separation is smaller than 40° and larger than 2° in the equatorial plane.

The first dynamic cluster in FIG. 10 is centered on the GSO-1 slot, and comprises 5 relaying satellites 1022, 1032, 1024, 1034, and 1026. The 5 satellites are moving in a first set of 5 different 24-hour orbits. As far as a data sender at a source 1002 and a ground terminal at a destination 1004 are concerned, the 5 satellites in the first dynamic cluster are moving daily in a first locus of a narrow figure "8" elongated in the north-south direction, similar to the scenarios depicted in FIG. 1A, FIG. 1B, and FIG. 1C. The figure "8" elongated in the N-S direction for the first dynamic satellite cluster, referred as the first "figure 8," is centered on the GSO-1 orbital slot in sky.

The second dynamic cluster in FIG. 10 is centered on the GSO-2 slot, and comprises 3 relaying satellites 1062, 1064, and 1066. The 3 satellites are in a second set of 3 different 24-hour orbits, which are kept with a 2° maximum inclined angle. As far as the source 1002 and the destination 1004 are concerned, the 3 satellites in the second dynamic cluster are moving daily in a set of second locus of 3 narrow figures "8" elongated in the north-south direction. The three figures "8" elongated in the N-S direction for the second dynamic satellite cluster, referred as second figures "8" are all centered on the GSO-2 orbital slot in sky.

In exemplifying communications systems via two clusters of inclined orbit satellites, let us further assume a 2-degree separation between the GSO-1 and GSO-2 orbital slots. The 5 satellites moving in the first cluster are designed for a fixed satellite service (FSS) to cover a first common service area. Each of the 5 satellites provides 24 transponders using a 500 MHz Ku-spectrum twice via polarization diversity, one in horizontal polarization (HP) and the other in vertical polarization (VP). Each transponder performs standard transponding functions for signals in a 36 MHz bandwidth. Twelve 36-MHz frequency slots are allocated with 20 MHz guard bands in-between two adjacent frequency slots in a frequency plan for a 500-MHz spectrum.

In one embodiment, the satellites in the second dynamic cluster are small satellites with weights less than 150 Kg each, or CubeSats with 10 Kg or less weight each. As an example, a satellite communication system with 3 small satellites moving in the second cluster is proposed to cover the first common service area using 500 MHz in Ku-spectrum twice, one in horizontal polarization (HP) and the other in vertical polarization (VP). The 3 small satellites 1062, 1064, and 1066 in the second dynamic cluster will provide identical services of a virtue fixed-satellite-service (FSS) satellite with 24 Ku transponders covering a specified service area on earth.

As a result, the 500 MHz Ku-spectrum is wide enough for 12 transponders in HP and 12 in VP. Each of the 3 small satellites 1062, 1064, and 1066 in the second dynamic cluster will be equipped with 8 of the 24 transponders. The three small satellites in Ku-band are dynamically and complementarily configured to one another in operating the total 24 transponders in various frequency slots at both HP and VP.

At the source 1002, a customized data structure for a data stream D(t) with a data rate R is formed in a 6-to-6 K-muxing processor in generating 6 K-muxed data streams with a data rate of R/5 each. The first 5 of the 6 K-muxed data streams are sent to the 5 relaying satellites in the first dynamic cluster through 5 dynamic spot beams, and the $6^{th}$ K-muxed data stream is sent to the satellites in the second dynamic cluster through a shaped contour beam. The shaped contour beam from a transmitting terminal at the source 1002 is dynamically optimized to cover all 3 moving satellites in the second dynamic cluster.

A smart multibeam antenna, similar to one of the three smart multibeam antennas 2030, 8030, and 9030, provides the 6 dynamic tracking beams. One possible design features a set of 6 dynamic shaped beams with orthogonal-beam (OB) radiation patterns. The first shaped beam will point its beam peak at the first satellite 1022, and 7 nulls respectively to 7 remaining satellite directions. The first 4 nulls are pointed to the satellites 1024, 1026, 1032, and 1034 in the first cluster. The remaining 3 nulls are directed to the three satellites 1062, 1064, and 1066 in the second dynamic cluster, and are within a dynamic main-lobe footprint of the $6^{th}$ shaped beam.

The $2^{nd}$, the $3^{rd}$, the $4^{th}$, and the $5^{th}$ shaped beams are dynamic spot beams pointed to the 4 respective satellites 1024, 1026, 1032, and 1034, and feature radiation patterns similar to the one of the first shaped beam. However, the $6^{th}$ shaped beam is pointed to a dynamic angular footprint covering the 3 satellites concurrently, and features 5 dynamic nulls pointed to the 5 satellites 1022, 1024, 1026, 1032, and 1034 in the first cluster.

Multiple data streams from a data source 1002 on or near the surface of earth 1010 are sent to the 2 dynamic clusters of relaying satellites via a multiple (M=6) beam ground terminal. We shall use FIG. 2 to illustrate major functions in a 6-beam ground terminal at the source 1002. A block diagram of a M-beam transmitter at a data source 1002, similar to the one depicted in FIG. 2, comprises three major blocks: a segmenting device 2022, a preprocessor 2024 performing a 6-to-6 K-muxing transform, and a smart 6-beam antenna 2030. The input to the segmenting device 2020 is connected to a data stream D(t). The outputs are 5 data substreams; D1(t), D2(t), D3(t), D4(t), and D5(t).

They are connected to first 5 inputs of a 6-to-6 K-muxing transform in the preprocessor 2024. The 6-to-6 K-muxing transform features 6 inputs and 6 outputs. The $6^{th}$ input is connected to E1(t), or an enveloping digital stream. E1(t) is a known data file to receiver at the destination 1004. Data enveloping process, digital envelopes, enveloping data streams, and enveloped data streams are extensively presented in U.S. Pat. No. 10,333,900. We shall not repeat them in this application again.

The 6 outputs of the 6-to-6 K-muxing transform are K-muxed data streams calculated via the following equation;

$$\underline{KN(t)} = \underline{W} * \underline{DN(t)} \quad (1)$$

where
$\underline{KN(t)} = [k1(t), k2(t), k3(t), k4(t), k5(t), k6(t)]^T$ and is the vector representing the 6 K-muxed data streams k1(t), k2(t), k3(t), k4(t), k5(t), and k6(t);

$\underline{W}$ is a 6-by-6 weighting matrix with 36 weights W11, W12, . . . , W65, and W66; and $\underline{DN(t)} = [D1(t), D2(t), D3(t), D4(t), D5(t), D(6)]^T$ where D6(t) is set to be the enveloping data stream E1(t).

The 6 K-muxed data streams k1(t), k2(t), k3(t), k4(t), k5(t), and k6(t) are in forms of enveloped data streams, and shall have nearly identical features to human sensors as those in E1(t). A selected E1(t) may be a video file, a digital picture, an audio file, or a digital file in a Microsoft Office format. They are converted to 6 K-muxed signal streams Sk1(t), Sk2(t), Sk3(t), Sk4(t), Sk(5), and Sk6(t) individually by a bank of modulators 2026 before being sent to a smart multibeam antenna 2030.

The data stream D(t) from the data source 1002 will be sent to the clusters of relaying satellites 1022, 1024, 1026, 1032, 1034, 1062, 1064, and 1066 in forms of radiated K-muxed signal streams Sk1(t), Sk2(t), Sk3(t), Sk4(t), Sk5(t), and Sk6(t) in a common RF frequency slot. In a receiver at the destination 1004, each of the captured K-muxed signal streams Sk1(t), Sk2(t), Sk3(t), Sk4(t), Sk5(t), and Sk6(t) after proper demodulations shall exhibit the nearly identical features to human sensors as those in E1(t). Furthermore, the receiver at the destination 1004 can reconstitute the original data stream D(t) with any 5 of the radiated K-muxed signal streams Sk1(t), Sk2(t), Sk3(t), Sk4(t), Sk5(t), and Sk6(t) captured in a common RF frequency slot as long as E1(t) is known a priori to the receiver.

The smart multibeam antenna 2030 comprises three major blocks: a digital beam forming (DBF) network 2032, a bank of RF front-ends 2034, and a reflector antenna 2036. In forming a first shaped beam, the DBF network 2032 will continuously replicate a first K-muxed signal stream, Sk1(t), into $N_e$ copies, where $N_e$ is the number of the feed array elements associated with the reflector antenna 2036. $N_e$ shall be greater than the total number of satellites in the two dynamic clusters. Each copy in a complex format with I/Q components will be assigned to an array element channel individually after being weighted or multiplied by a weighting parameter with I/Q components. A first beam weight vector (BWV) featuring $N_e$ weighting parameters in an I/Q format will shape a radiated beam by a reflector antenna 2036 with $N_e$ feed array elements placed on a focal plane of the reflector. The weighted first K-muxed signal streams are distributed in a first set of $N_e$ element channels.

The functions of an output manifold the DBF network 2032 and those of the bank of the RF front-ends 2034 are similar to the ones described for Embodiment 1. Geometry for the reflector antenna 2036 is chosen to concurrently support 5 dynamic spot beams and a dynamic contour beam. The 5 spot beams are to track satellites 1022, 1032, 1024, 1034, and 1026 in the first dynamic cluster while the contour beam is optimized to cover all three satellites 1062, 1064, and 1066 in the second dynamic cluster. A feed array with $N_e$ elements is placed on a plane slightly off from the focal plane of the reflector. $N_e$ may range from 15 to 20 for better flexibility in beam shaping and optimizing procedures for the scenarios with 8 satellites distributed in the two separated clusters.

In one embodiment, the 3 satellites 1062, 1064, and 1066 depicted in FIG. 10 comprise identical configurable payloads, and their payload configurations can be dynamically programmed in real time similar to software defined radios. The 3 satellites 1062, 1064, and 1066 are in the second dynamic cluster centered on the GSO-2 orbital slot. The incline angles for the associated slightly inclined GSO orbits are larger than 2 degrees.

The available data links between a data source 1002 and a data destination 1004 are varying and predictable in daily operation via the 8 relaying satellites 1022, 1032, 1024, 1034, 1026, 1062, 1064, and 1066 in slightly inclined GSO orbits. Due to relative angular separations in different times of a day among adjacent satellites, the number of available links from the satellites 1022, 1032, 1024, 1034, and 1026 in the first dynamic cluster to a ground user ranges from 3 to 5, while the number of available links from the satellites 1062, 1064, and 1066 in the second dynamic cluster may oscillate between 1 and 3.

As a result, the smart ground terminals at the source 1002 and the destination 1004 shall be configured to support Nb dynamic beams where Nb is altered between 4 and 8 following a daily schedule.

At the source 1002, a customized data structure for a data stream D(t) with a data rate R is formed in a preprocessor 2024 with a K-muxing transform in generating M K-muxed data streams with a data rate of R/M each. The M K-muxed data streams are sent to the Nb relaying satellites through Nb dynamic spot beams. We shall present one of many available configurations of K-muxing transforms in generating M K-muxed data streams, in which only Nb of them are to be transported through Nb satellites concurrently. The configuration with M=Nb+1 shall exemplify operation characteristic of secured data transport via Nb relaying satellites.

In configuring a data structure for a data stream D(t) with a data rate R, the data stream D(t) is segmented by a segmentation device 2022 into Nb data substreams which are connected to the first Nb inputs of a M-to-M K-muxing transform in a preprocessor 2024, where M=Nb+1. The last input is connected to a known data stream y(t) which shall have an amplitude level adjusted to become comparable to that of the D(t). The data stream y(t) shall be known a priori only for intended receivers at the destination 1004. The outputs from the K-muxing transform comprise M different linear combinations of the Nb data substreams and the data stream y(t). The D(t) is transformed into a data structure with M dimensions. The M K-muxed data streams are the outputs from the K-muxing transform. Each is a result of self jamming among the Nb data substreams and y(t).

Only Nb of the M outputs are selected and then modulated by a bank of modulators 2026 before being sent by a smart multibeam antenna 2030, 8030, or 9030 to the destination 1004 via Nb satellites. The radiated signals by these multiple beams are Nb of the M K-muxed signal streams in a common RF frequency slot.

At destinations 1004, with the a priori known data stream y(t), D(t) can be reconstituted in those intended receivers having capability of capturing all Nb relayed K-muxed signal streams. Receivers that do not have the a priori known data stream y(t) cannot reconstitute the original data stream D(t) even when all Nb relayed K-muxed signal streams are available.

Selected K-muxing transforms in the preprocessor 2024 are altered according to agreed schedules between the source 1002 and desired destinations 1004 for enhanced data transfer privacy via the multiple (Nb) available satellites. When Nb equals to 4 or 8, the selected M-to-M K-muxing transform may be configured to use Fast Fourier Transform (FFT) matrices, Hadamard matrices, or other orthogonal matrices for a better computational efficiency. On the other hand, for different data transport requirements and applications, M for the M-to-M K-muxing transform can be dynamically configured to be an integer identical to, slightly greater than, or less than Nb.

A smart multibeam antenna, similar to one of the three smart multibeam antennas 2030, 8030, and 9030, provides the Nb dynamic tracking beams. One possible design of a smart multibeam antenna features Nb dynamic shaped beams with orthogonal-beam (OB) radiation patterns. The first shaped beam will point its beam peak at the first satellite 1022, and Nb−1 nulls respectively to the remaining Nb−1 satellite directions.

In one embodiment, the 3 satellites 1062, 1064, and 1066 in FIG. 10 comprise identical configurable payloads, and their payload configurations can be dynamically programmed in real time similar to software defined radios. These small satellites in the second dynamic cluster centered on the GSO-2 orbital slot can be deployed to function as active scatters in MIMO communications configurations. Large separations among the dynamic clusters of scattering satellites enable us to reuse the spectrums multiple times in the MIMO configurations.

Methods and apparatuses of organizing the scattering satellites in clusters are all in the ground terminals at sources 1002 and at destinations 1004. In transmit modes, the associated ground terminals in the MIMO configurations shall have similar functional blocks at a source 1002 as those in FIG. 2, FIG. 8, and FIG. 9, except that an additional MIMO processor is inserted after the bank of the modulators 2026 and before the smart multibeam antenna 2030, 8030, or 9030.

The MIMO systems using the small satellites in clusters near a GSO orbital slot can be configured efficiently for spoke-and-hub, point-to-point, and/or point-to-multipoint communications. The MIMO processor at the source 1002, and those at destinations 1004 shall perform handshaking procedures and measure the current channel-state-information (CSI) dynamically. The smart multibeam antenna 2030, 8030, or 9030 at the source 1002 exhibit features of multiple inputs for individual shaped beams, which are configured to dynamically select different fields of view and cover unique but different sets of multiple satellites in the clusters.

The same methods and apparatuses using satellites as active scattering platforms for high-throughput MIMO communications transmissions can be applied to clusters of low-earth-orbit (LEO) satellites. They may be used via clusters of small cells for enhanced communication bandwidths in terrestrial communications such as 5G or advanced cell communications configurations.

In one embodiment, the 3 satellites 1062, 1064, and 1066 in FIG. 10 comprise identical regenerative payloads to function as routers in space. A regenerative transponder amplifies and reconstructs a distorted digital signal, and develops a nearly perfect replica of the original at its output at a translated carrier frequency. Regenerative transponders are a major key to digital transmission in stopping noise incurred in propagation paths.

These small satellites in the second dynamic cluster centered on the GSO-2 orbital slot may have cross-links connecting some of the router ports to other satellites. Large separations among the clusters of the satellites with regenerative transponders and crosslinks enable us to reuse the spectrums multiple times in the configurations.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

In one embodiment, each of the preprocessor, post-processor, optimization processor, K-mux processor, MIMO processor disclosed herein is a processing system that includes a Central Processing Unit (CPU) or processor. The CPU is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU may have simultaneous multithreading feature to further exploit the parallelism due to multiple threads across the multiple cores. In addition, the CPU may have internal caches at multiple levels.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A source terminal for communications with a destination terminal, both located near or on earth surface, via a plurality of satellite links to a first cluster and a second cluster of satellites in corresponding slightly inclined Geostationary Satellite Orbits (GSOs), the first and second clusters of satellites are centered on first and second GSO orbital slots respectively as viewed by the source terminal and the destination terminal, the source terminal comprising:
    a transmitter comprising:
        a preprocessor configured to perform a K-muxing transform on M concurrent input data streams to generate concurrently M output data streams, M being an integer greater than 1, each of the M output data streams being a linear combination of the M concurrent input data streams, the K-muxing transform having an inverse transform;
        a bank of modulators configured to transform N of the M output data streams into N signal streams destined for the destination terminal, N being an integer less than or equal to M; and
        a multibeam antenna system configured to concurrently and dynamically track and communicate with the first and second clusters of satellites via the plurality of satellite links, the multibeam antenna system transforming the N signal streams into N shaped beams and radiating $N_1$ of the N shaped beams towards the first cluster of satellites and $N_2$ of the N shaped beams towards the second cluster of satellites, $N_1$ and $N_2$ being positive integers and $N_1+N_2=N$.

2. The source terminal of claim 1, wherein the first cluster of satellites comprises $N_1$ satellites and the second cluster of satellites comprises J satellites, where J is an integer greater than or equal to 1.

3. The source terminal of claim 2, wherein the $N_1$ of the N shaped beams are dynamic spot beams covering respectively the $N_1$ satellites in the first cluster of satellites.

4. The source terminal of claim 3, wherein the $N_1$ dynamic spot beams are configured to have orthogonal-beam radiation patterns, each of the $N_1$ dynamic spot beams pointing a beam peak at a respective satellite of the $N_1$ satellites in the first cluster of satellites and pointing $N_1$ minus 1 nulls respectively at remaining $N_1$ minus 1 satellites of the $N_1$ satellites and pointing J nulls respectively at the J satellites in the second cluster of satellites.

5. The source terminal of claim 2, wherein $N_2=1$ and the $N_2$ of the N shaped beams is a shaped contour beam dynamically optimized to cover the J satellites in the second cluster of satellites.

6. The source terminal of claim 5, wherein the shaped contour beam is configured to point dynamically to an angular footprint covering the J satellites concurrently and to point dynamically $N_1$ nulls to the $N_1$ satellites respectively.

7. The source terminal of claim 1, wherein the transmitter further comprises:
a segmenter coupled to the preprocessor and configured to transform a source data stream into L of the M concurrent input data streams, L being a positive integer less than or equal to M.

8. The source terminal of claim 1, wherein the M concurrent input data streams comprise at least one known a priori data stream.

9. The source terminal of claim 1, wherein the multibeam antenna system comprises:
a digital beam forming system configured to transform the N signal streams into the plurality of weighted signal streams corresponding to the N shaped beams, using beam weight vectors;
a bank of RF front-ends coupled to the digital beam forming system and configured to condition and amplify the weighted signal streams; and
a smart array antenna coupled to the bank of RF front-ends and configured to transmit the weighted signal streams in the N shaped beams.

10. The source terminal of claim 9, wherein the smart array antenna is a multibeam reflector antenna or a phased array antenna or a sparse array antenna.

11. The source terminal of claim 9, wherein the smart array antenna is a multibeam reflector antenna comprising a reflector having a focal plane and an array of feed elements located on the focal plane of the reflector or at a distance slightly off from the focal plane of the reflector.

12. The source terminal of claim 9, wherein the multibeam antenna system further comprises:
a controller configured to dynamically control pointing directions and beam shapes of the shaped beams by dynamically providing updated beam weight vectors to the digital beam forming system, the controller comprising:
an optimization processor configured to receive, as inputs, data collected by diagnostic beams, local time of day and desired performance constraints, calculate the updated beam weight vectors based on the inputs, and output the updated beam weight vectors.

13. The source terminal of claim 12, wherein the desired performance constraints comprise at least one of the following: number of the shaped beams, beam peak directions, minimum peak gains in dB of the shaped beams, relative null directions relative to beam peaks, suppression levels for directional nulls in dB, sidelobe levels, minimum gain in dB for shaped contour beams, and suppression levels in dB beyond desired coverage.

14. A system for communications between a source terminal and a destination terminal, both located near or on earth surface, via a plurality of satellite links to a cluster of satellites, the system comprising:
the source terminal comprising:
a transmitter comprising:
a preprocessor configured to perform a K-muxing transform on M concurrent input data streams to generate concurrently M output data streams, M being an integer greater than 1, each of the M output data streams being a linear combination of the M concurrent input data streams, the K-muxing transform having an inverse transform;
a bank of modulators configured to transform the M output data streams into N signal streams destined for the destination terminal, N being an integer less than or equal to M;
a multiple-input multiple output (MIMO) processor coupled to the bank of modulators, configured to perform handshaking procedure with the destination terminal and to measure channel-state-information dynamically; and
a multibeam antenna system coupled to the MIMO processor, configured to dynamically track and communicate with the cluster of satellites via the plurality of satellite links, the multibeam antenna system transforming the N signal streams into a plurality of shaped beams and radiating the shaped beams towards the cluster of satellites.

15. The system of claim 14, wherein the transmitter further comprises:
a segmenter coupled to the preprocessor and configured to transform a source data stream into L of the M concurrent input data streams, L being a positive integer less than or equal to M.

16. The system of claim 14, wherein the multibeam antenna system comprises:
a digital beam forming system configured to transform the N signal streams into the plurality of weighted signal streams corresponding to the shaped beams, using beam weight vectors;
a bank of RF front-ends coupled to the digital beam forming system and configured to condition and amplify the weighted signal streams; and
a smart array antenna coupled to the bank of RF front-ends and configured to transmit the weighted signal streams in the shaped beams.

17. The system of claim 16, wherein the multibeam antenna system further comprises:
a controller configured to dynamically control pointing directions and beam shapes of the shaped beams by dynamically providing updated beam weight vectors to the digital beam forming system, the controller comprising:
an optimization processor configured to receive, as inputs, data collected by diagnostic beams, local time of day and desired performance constraints, calculate the updated beam weight vectors based on the inputs, and output the updated beam weight vectors.

18. The system of claim 14, wherein the cluster of satellites comprises at least one of the following: small satellites weighing about 100 kilograms each; mini-satellites such as nanosats or CubeSats weighing much less than 100 kilograms each; high-throughput satellites (HTS) with capability of reconfigurable spot beams; or fixed service satellites (FSS) having capability of reconfigurable contour beams.

19. The system of claim 14, wherein the cluster of satellites comprises satellites in corresponding slightly inclined Geostationary Satellite Orbits (GSOs), the cluster of satellites being centered on a GSO orbital slot as viewed by the source terminal and the destination terminal, the satellites functioning as active scattering platforms for MIMO communications.

20. The system of claim 14, wherein the cluster of satellites comprises low-earth-orbit (LEO) satellites, the LEO satellites functioning as active scattering platforms for MIMO communications.

* * * * *